Figure 1:
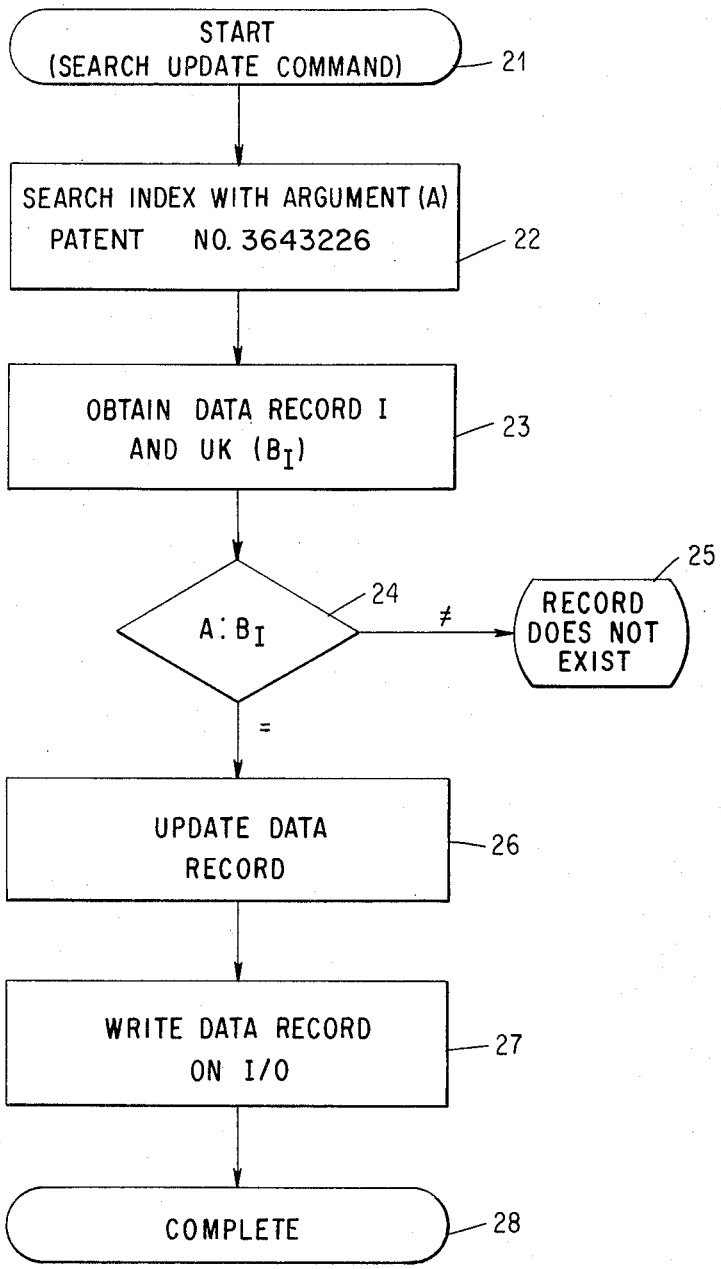
Figure 2:
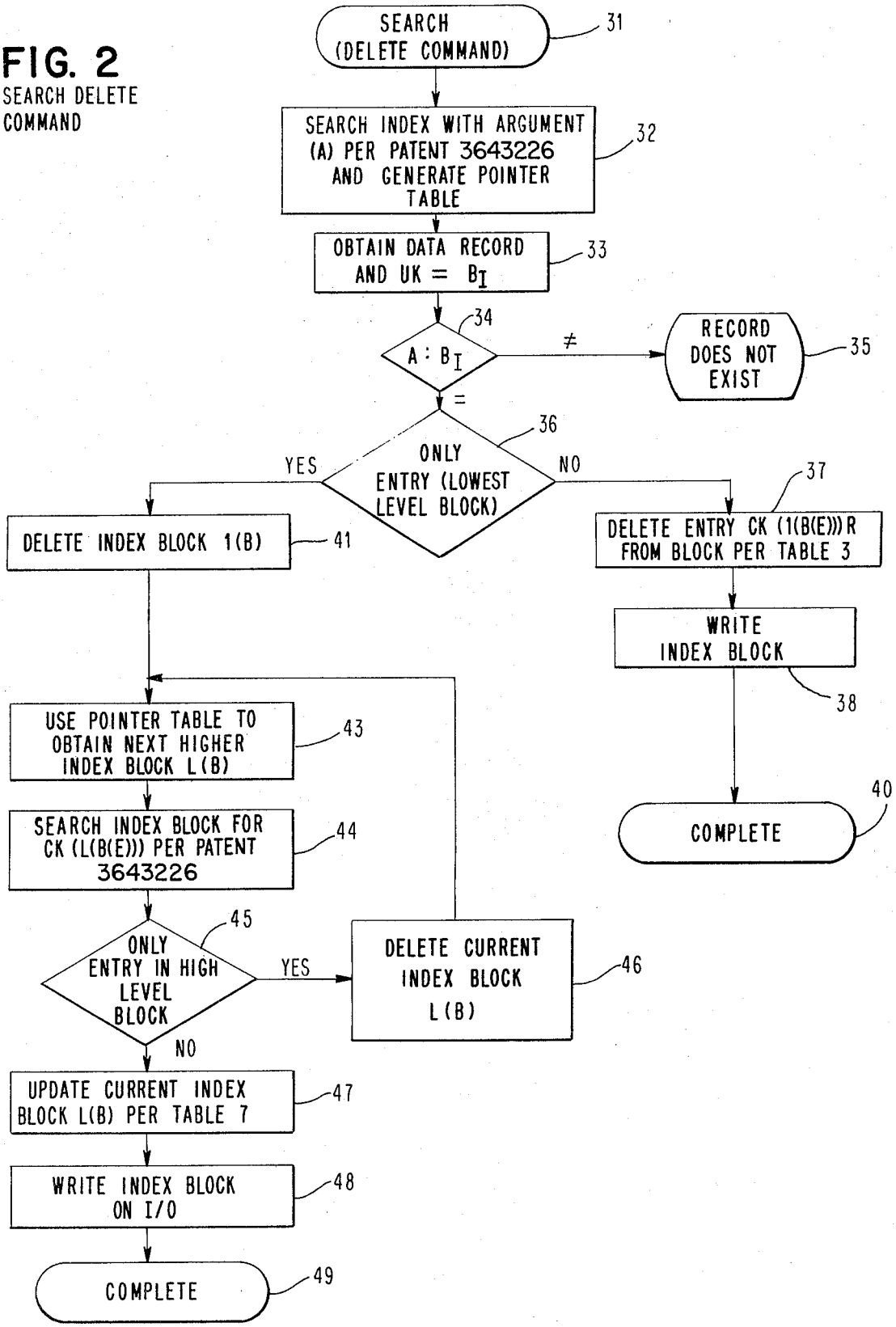
Figure 3A:
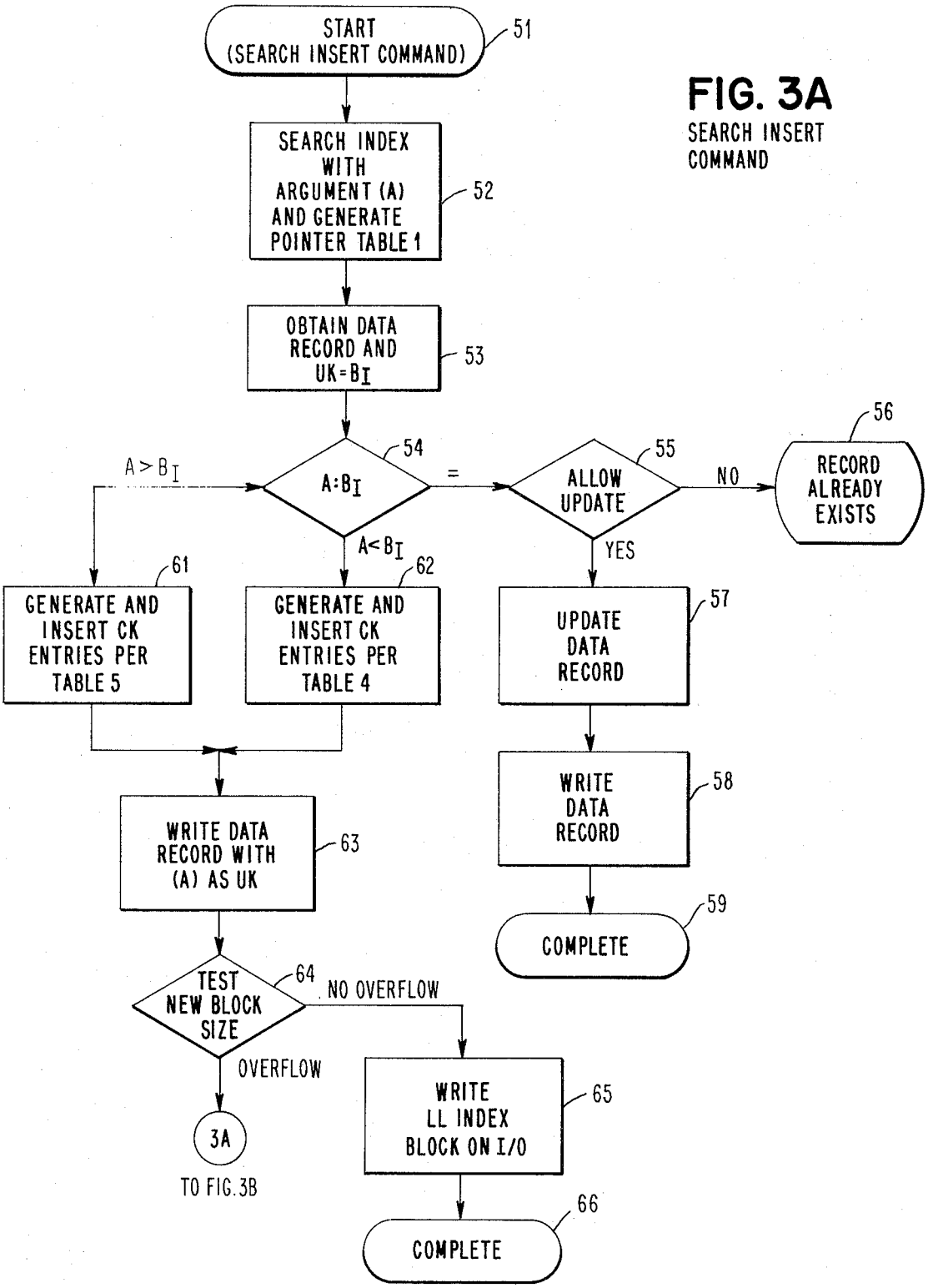
Figure 3B:
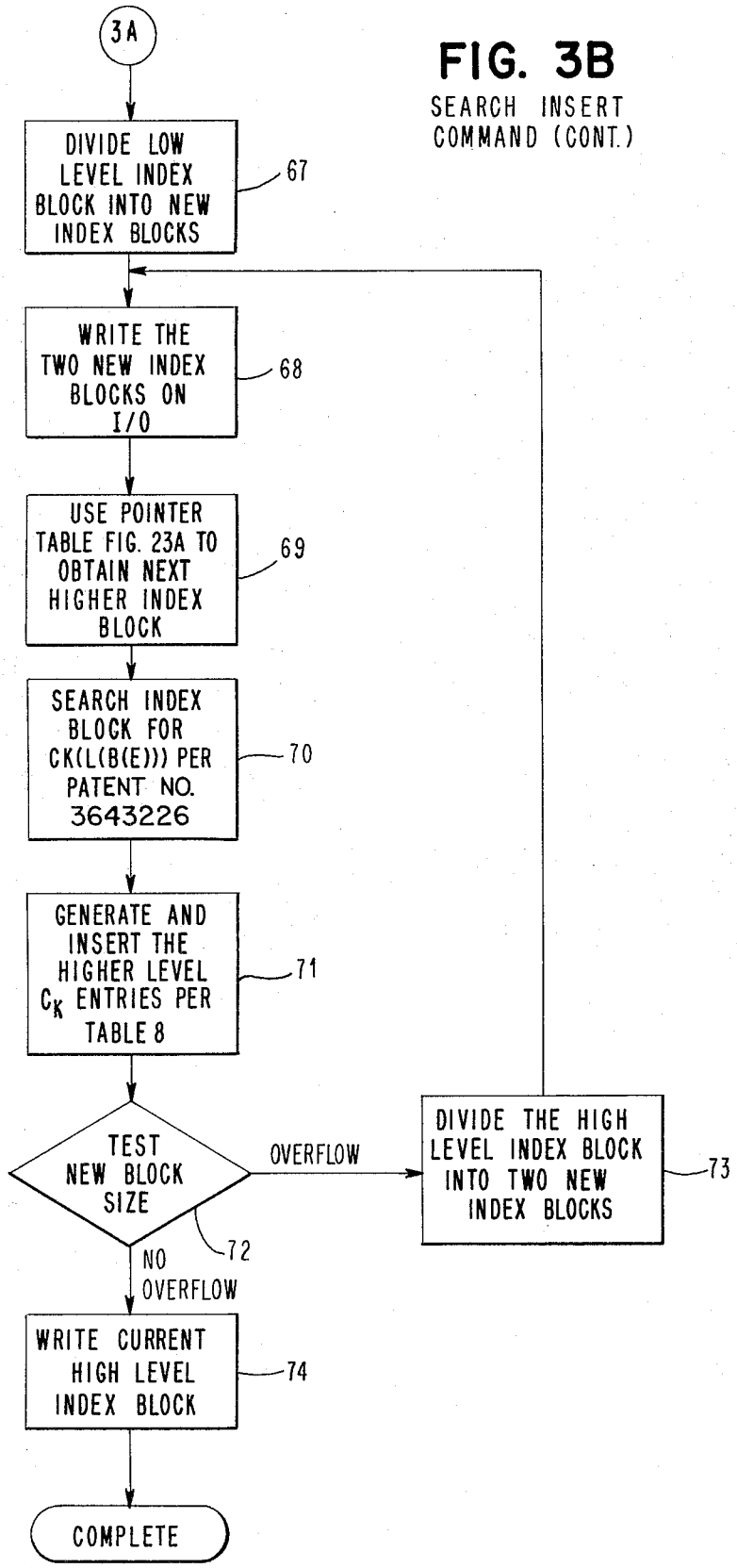
Figure 4:
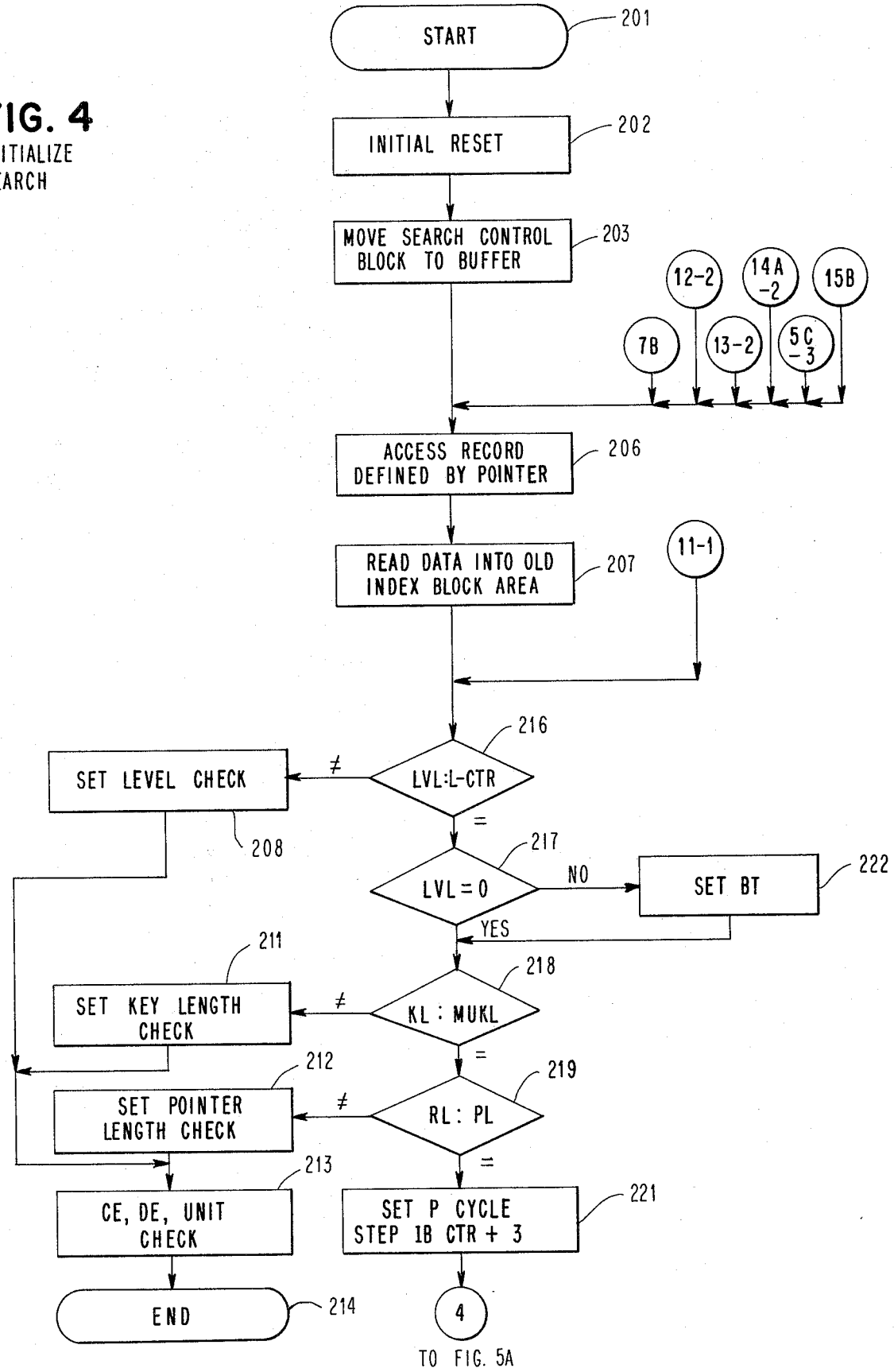
Figure 5A:
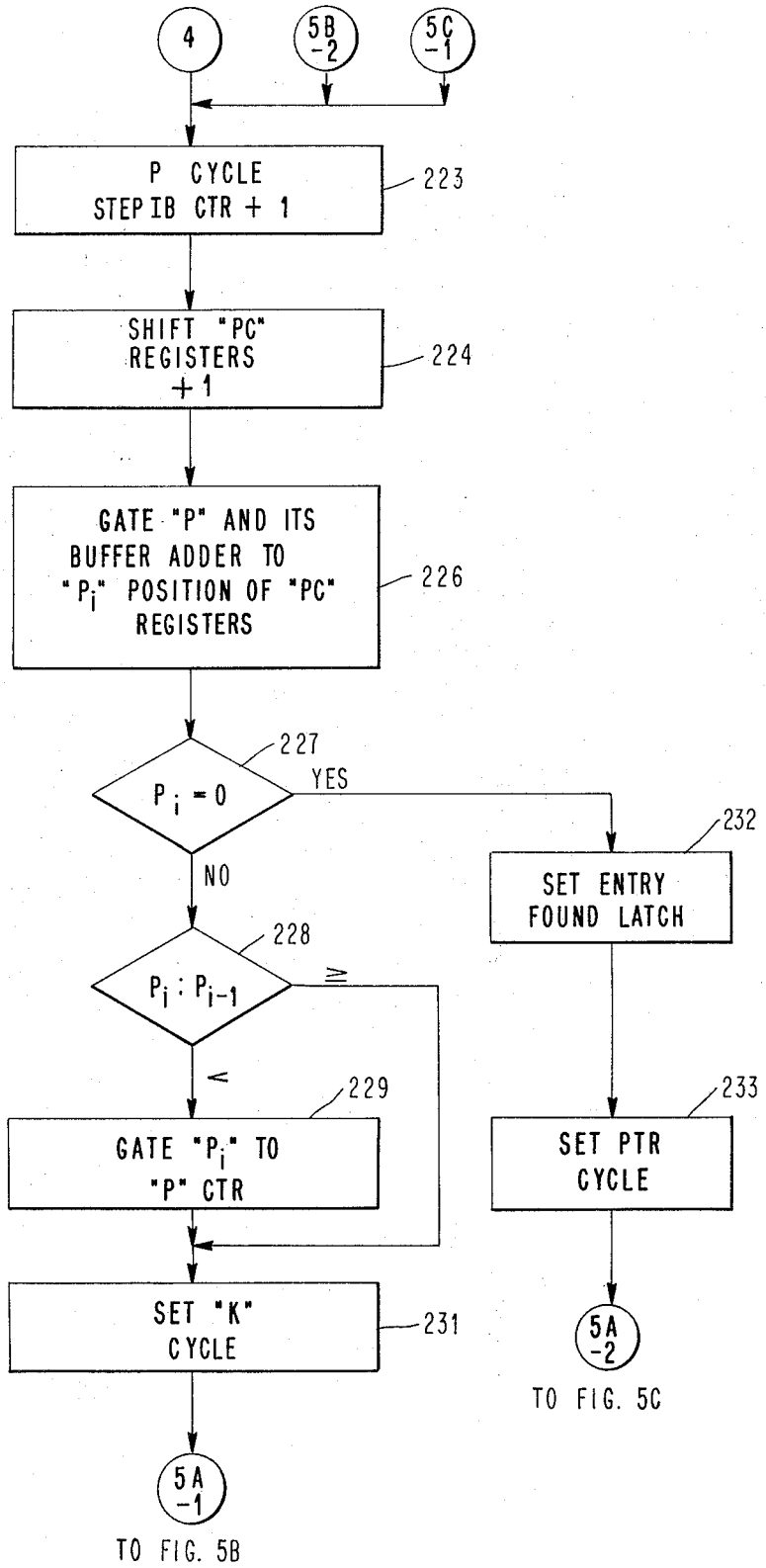
Figure 5B:
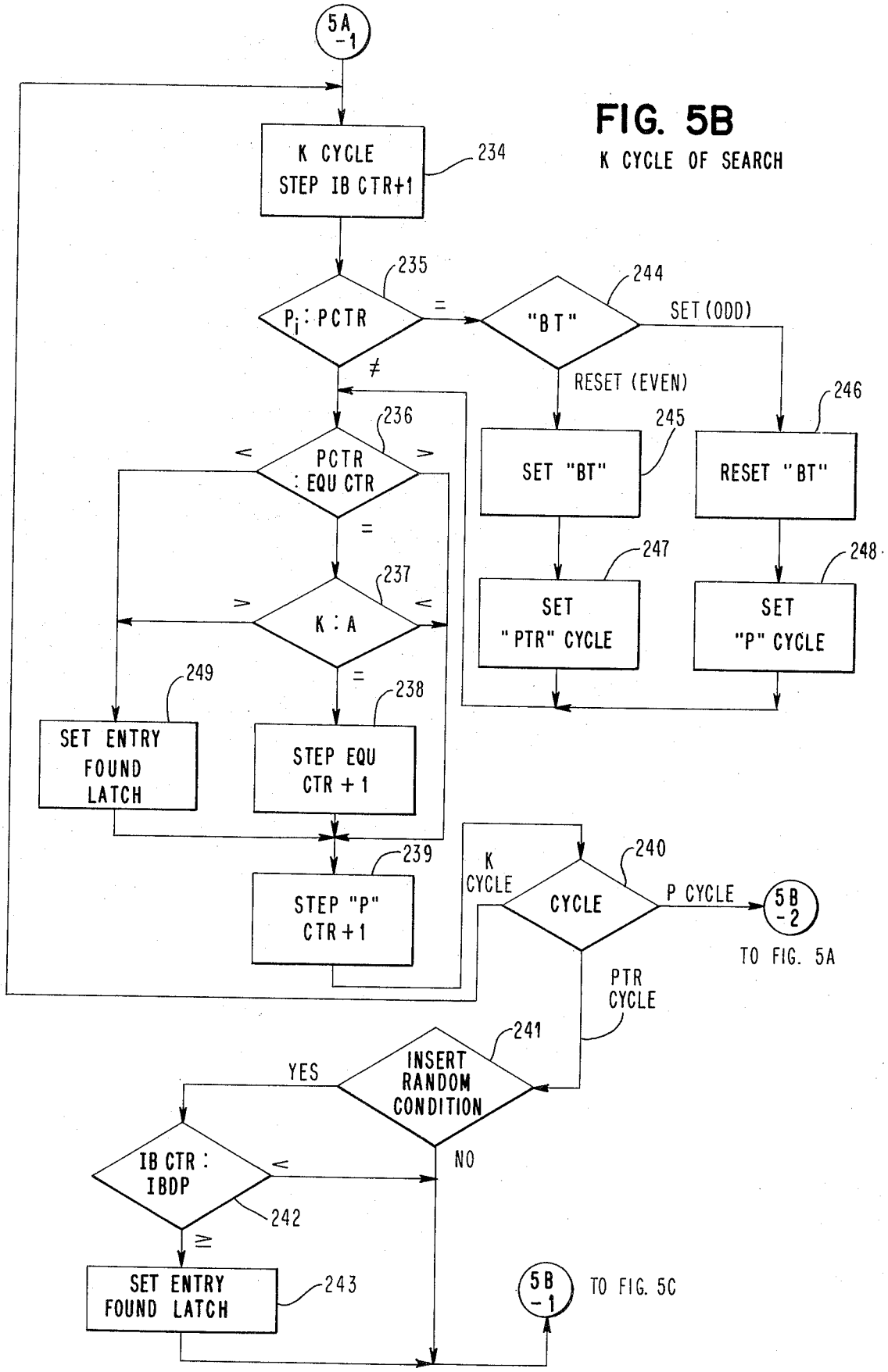
Figure 5C:
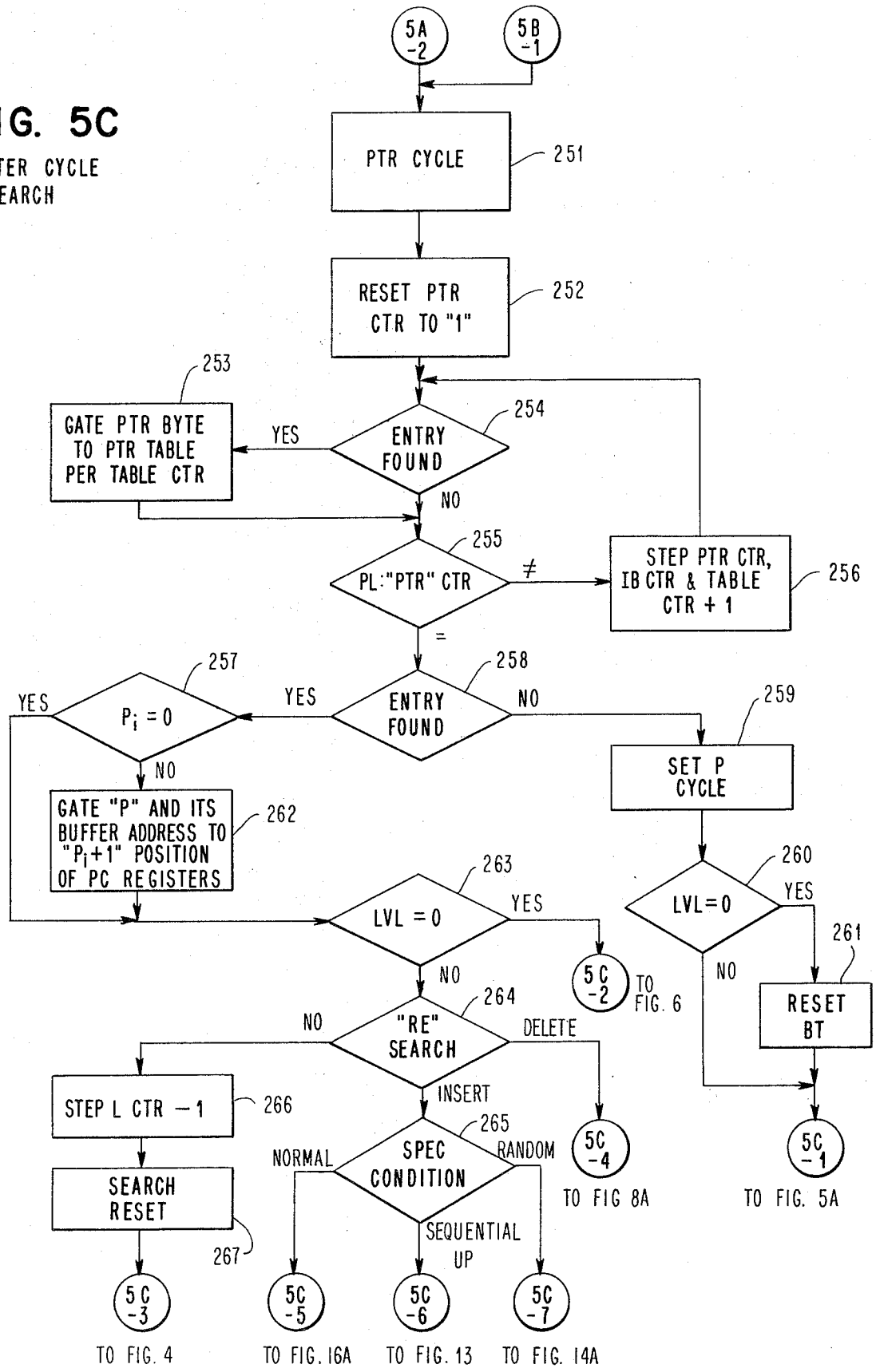
Figure 6:
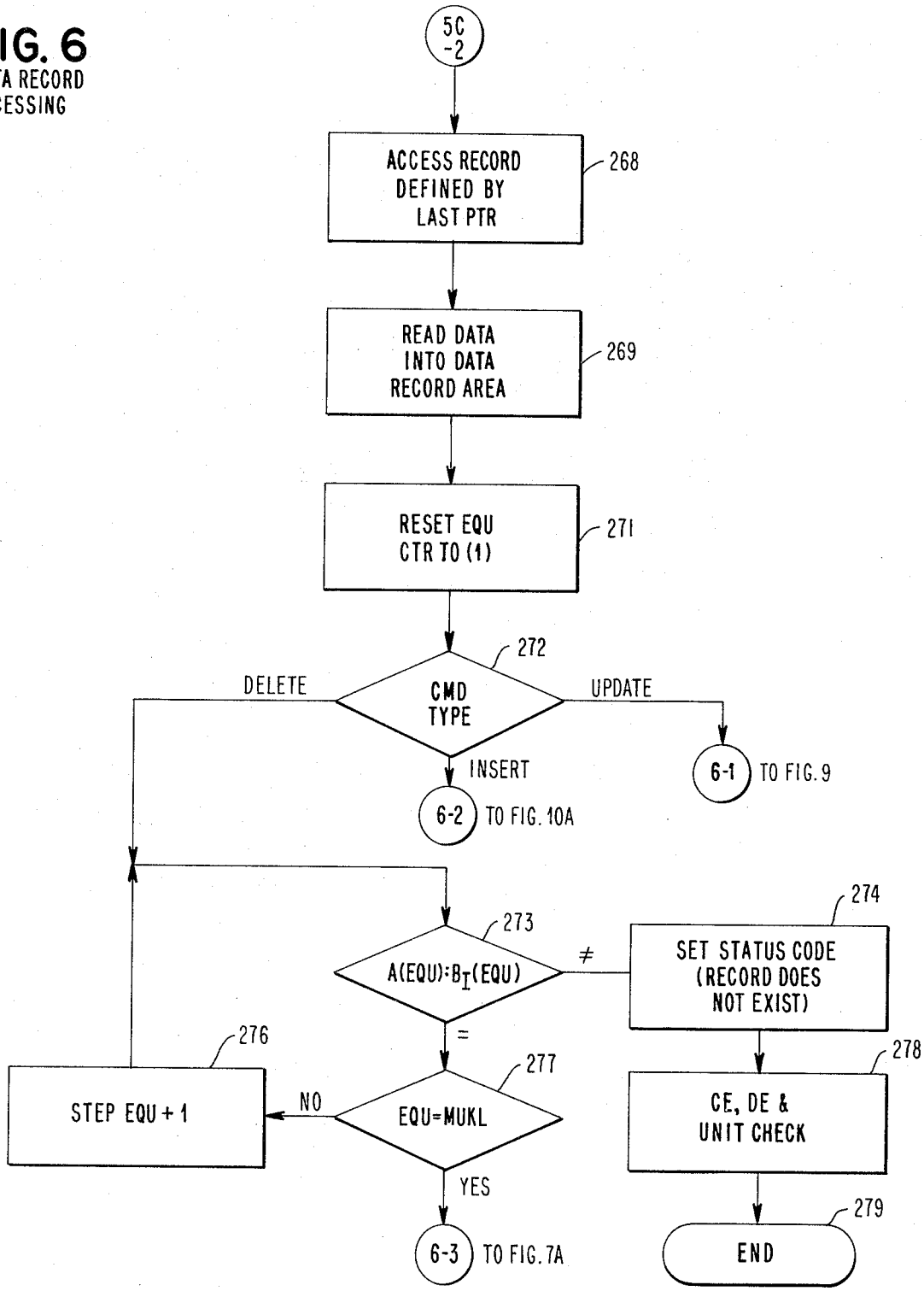
Figure 7A:
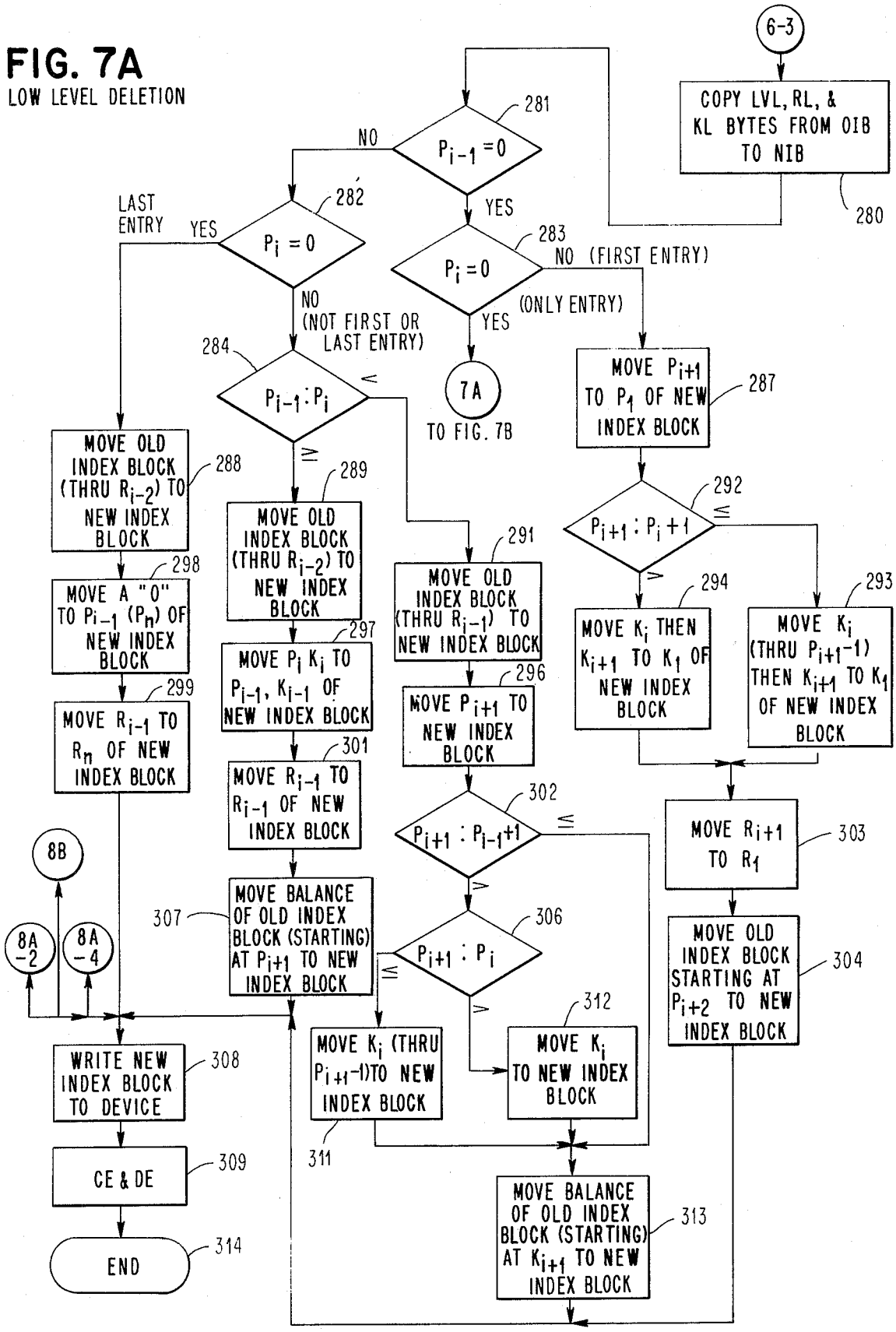
Figure 7B:
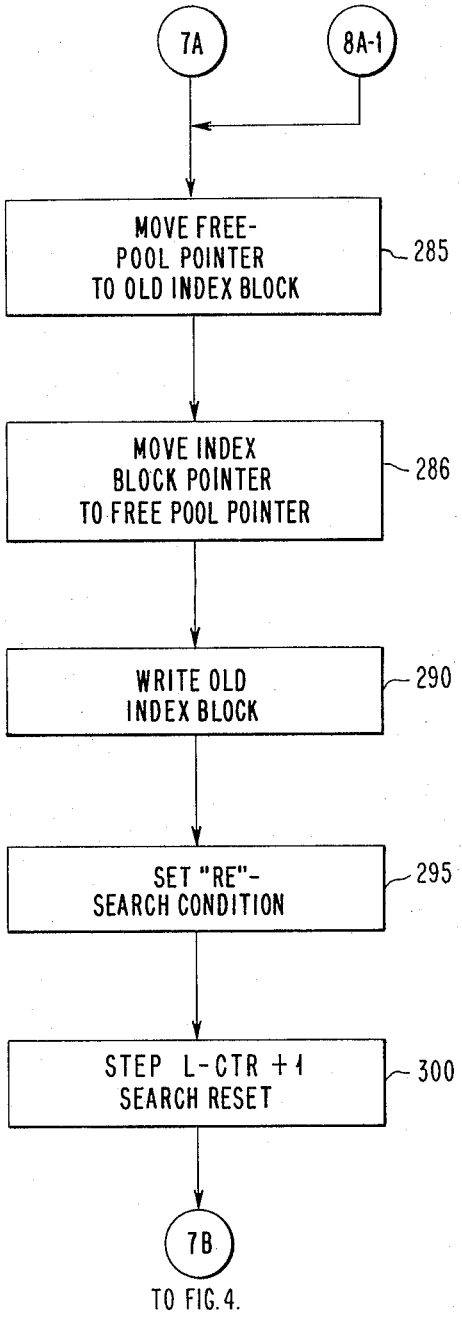
Figure 8A:
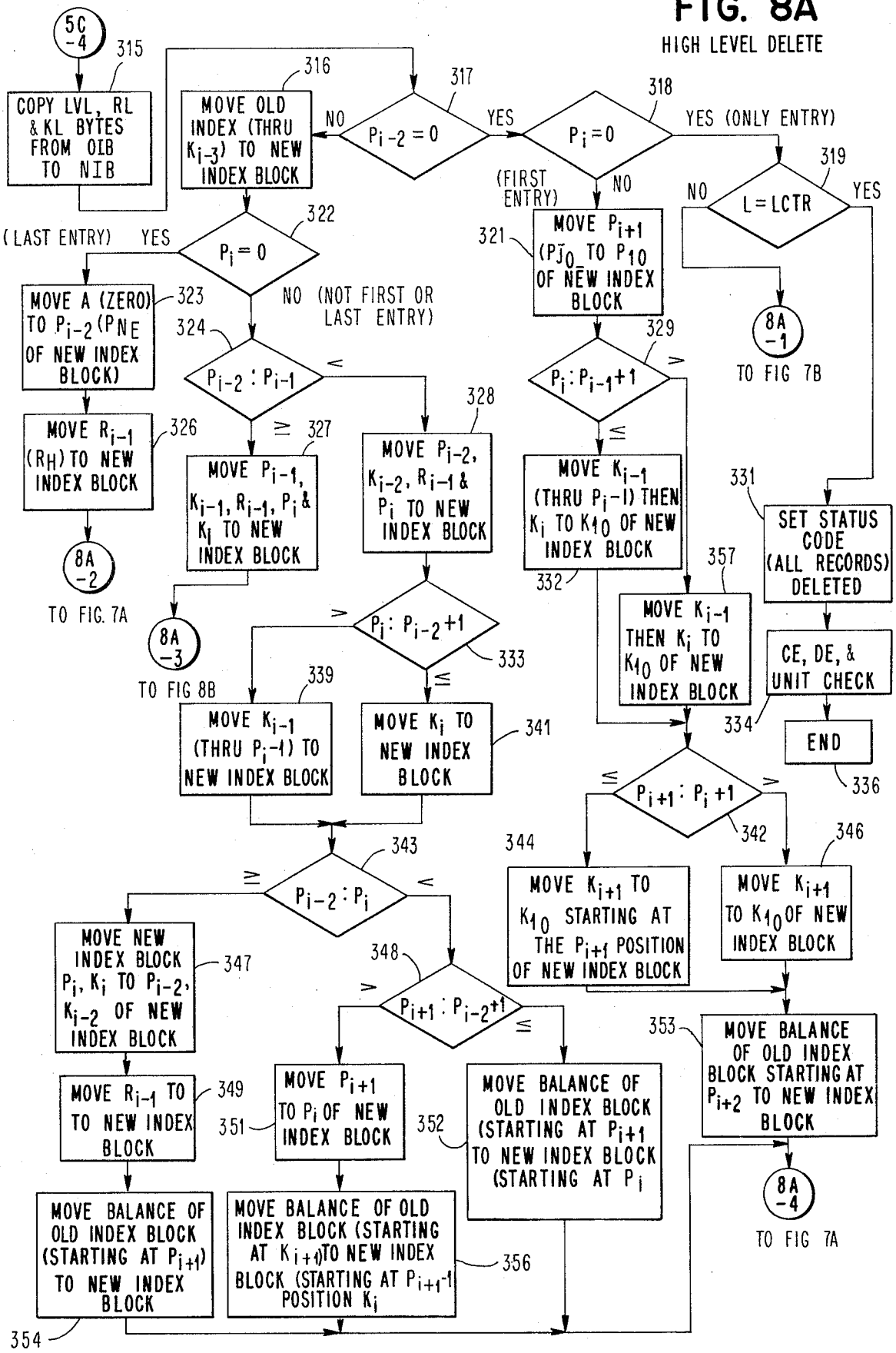
Figure 8B:
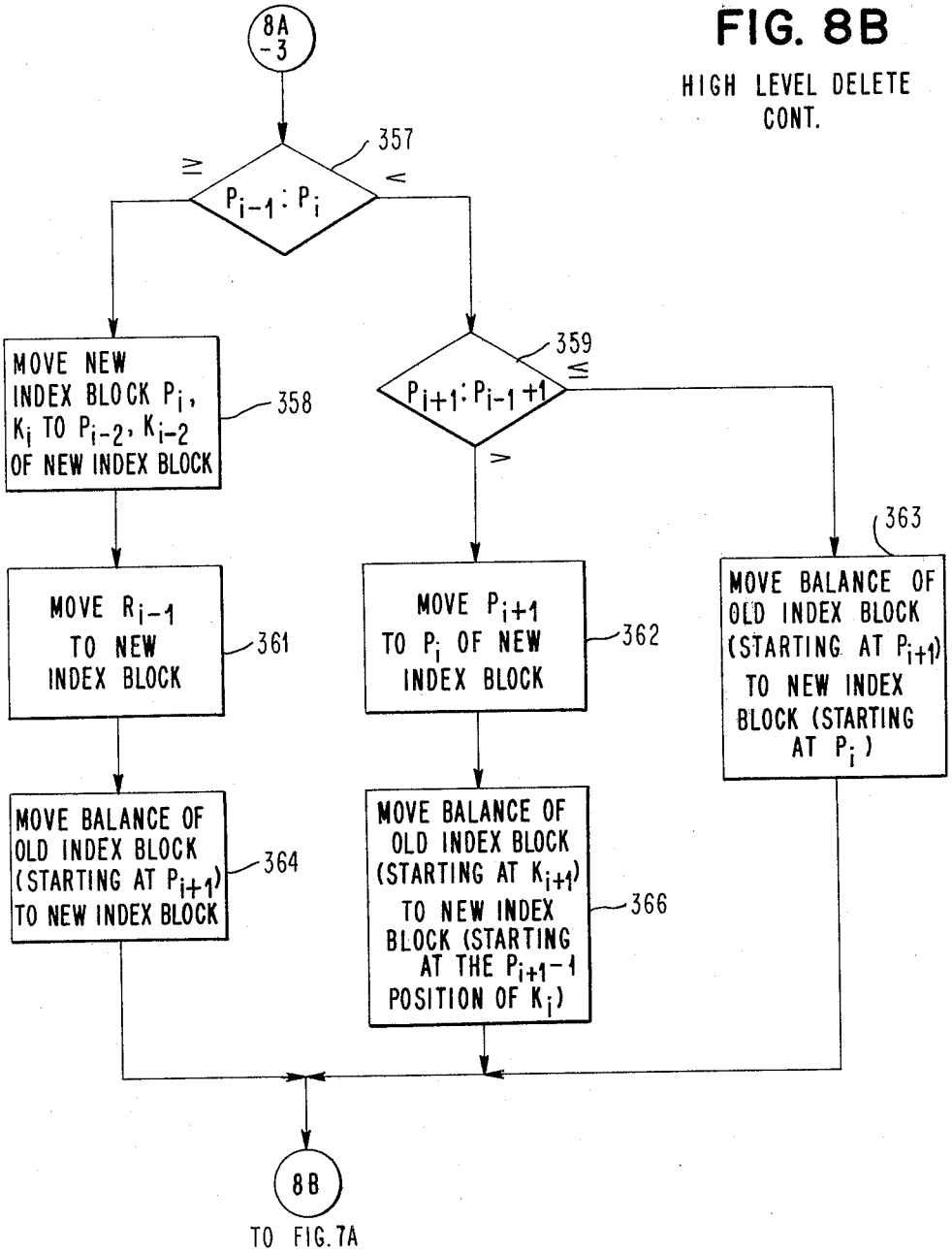
Figure 9:
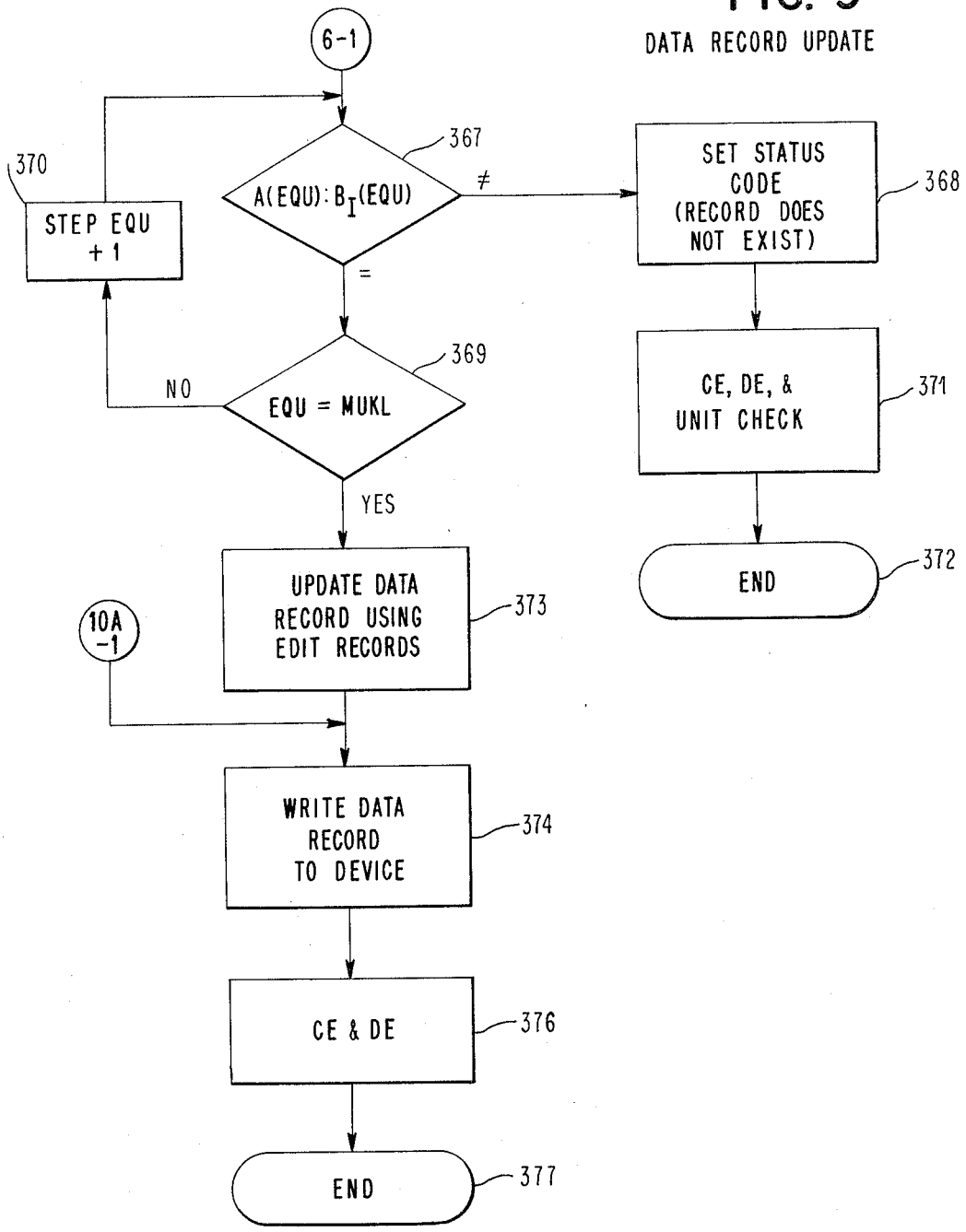
Figure 10A:
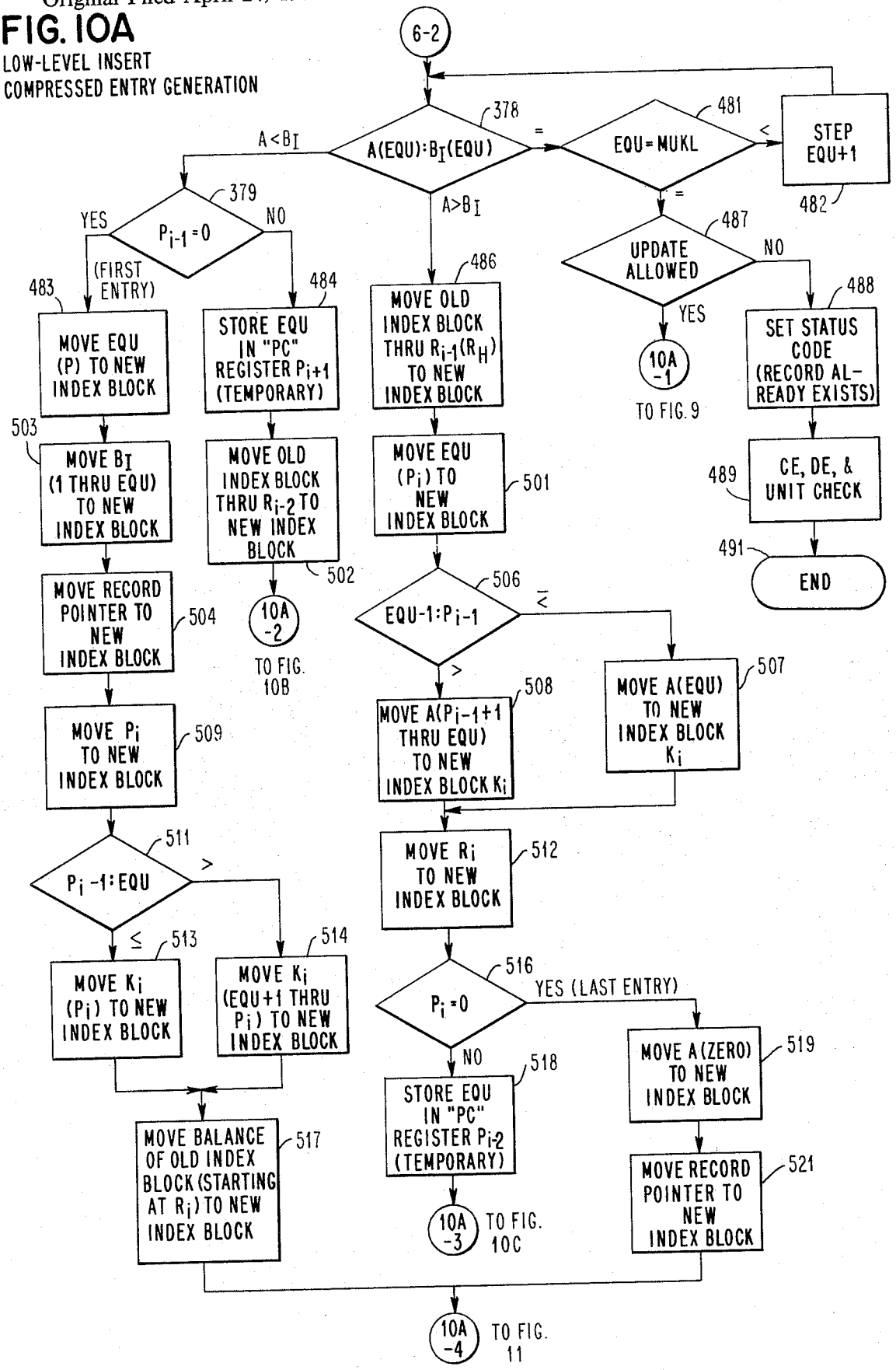
Figure 10B:
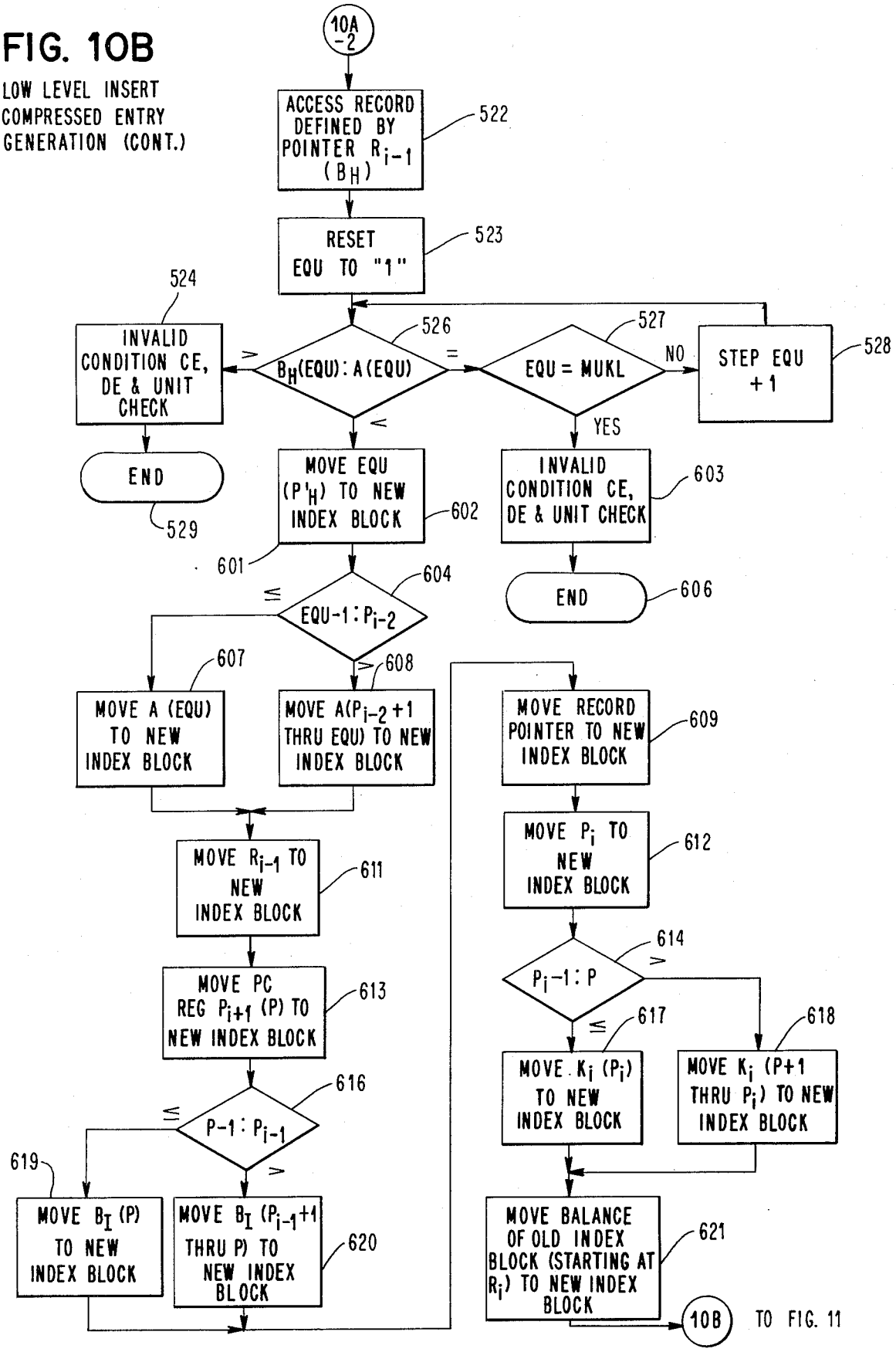
Figure 10C:
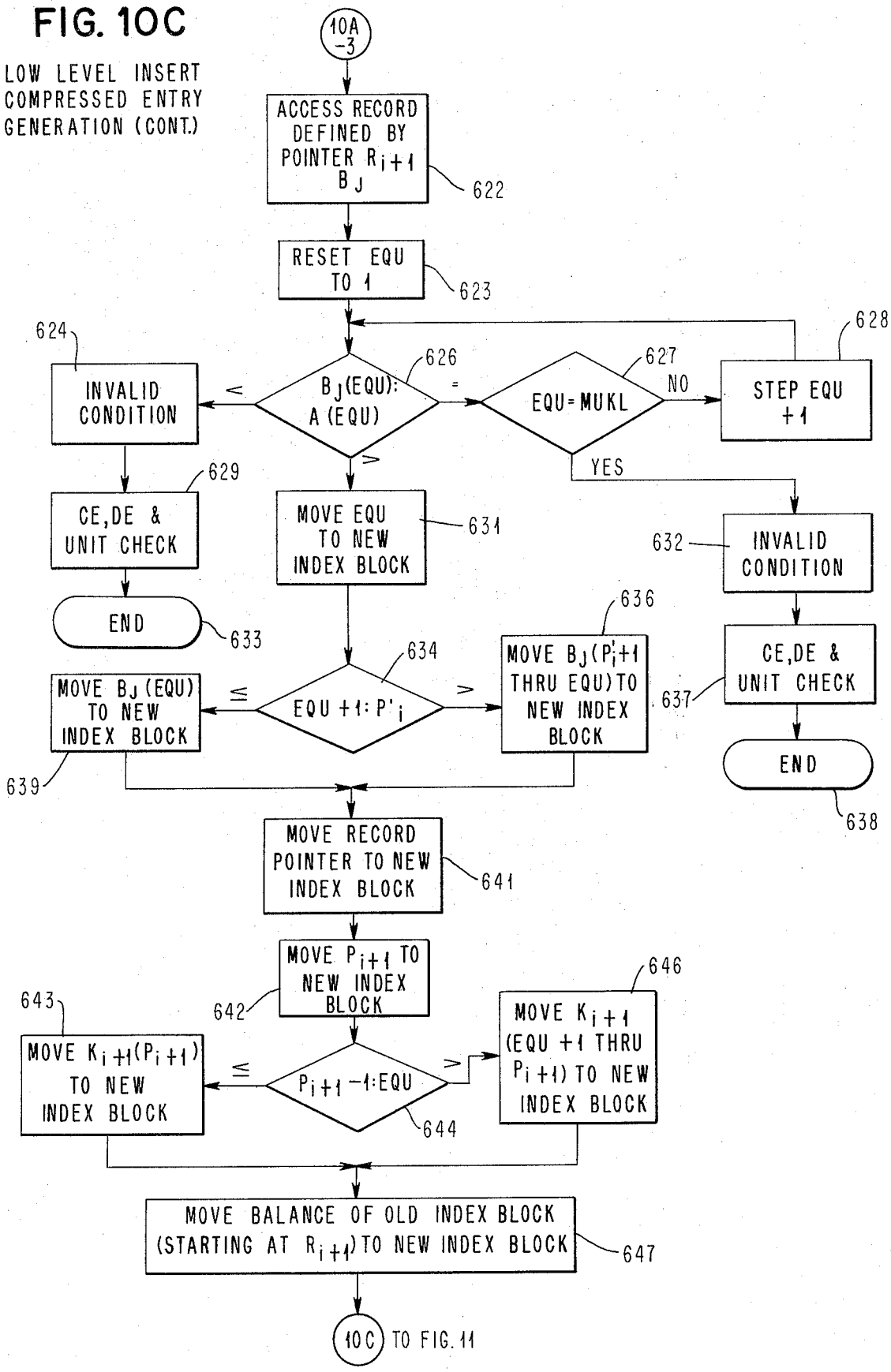
Figure 11:
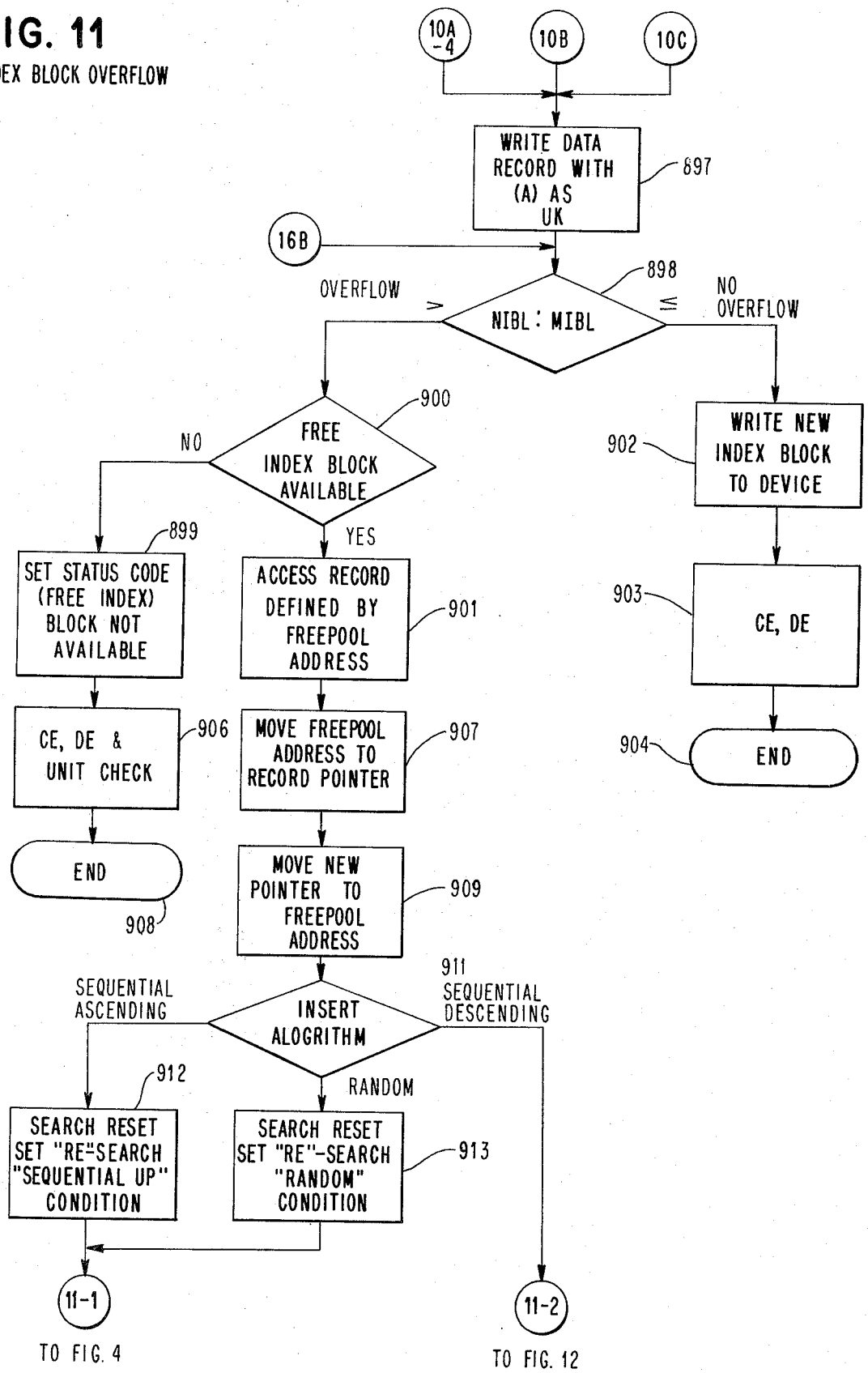
Figure 12:
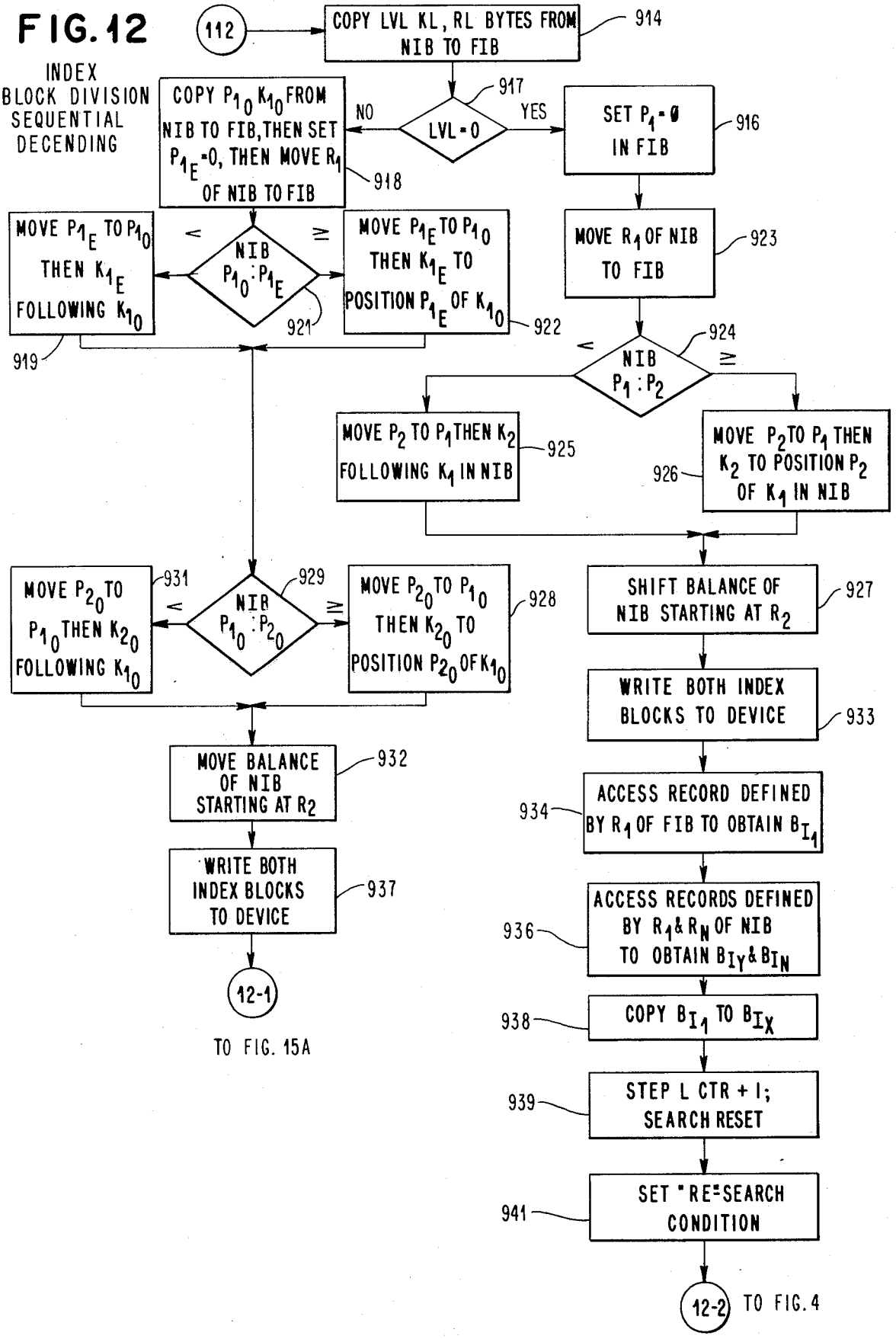
Figure 13:
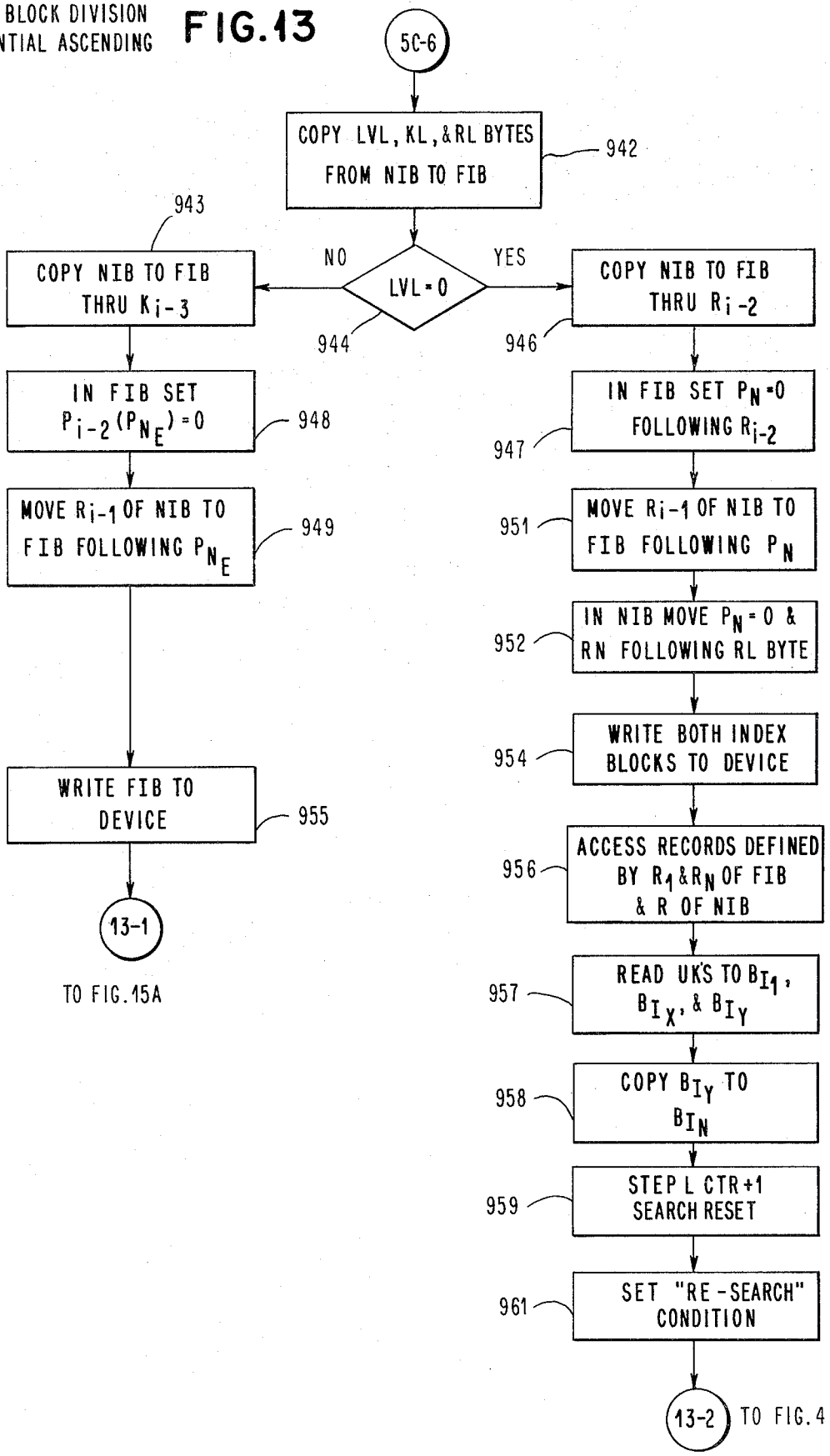
Figure 14A:
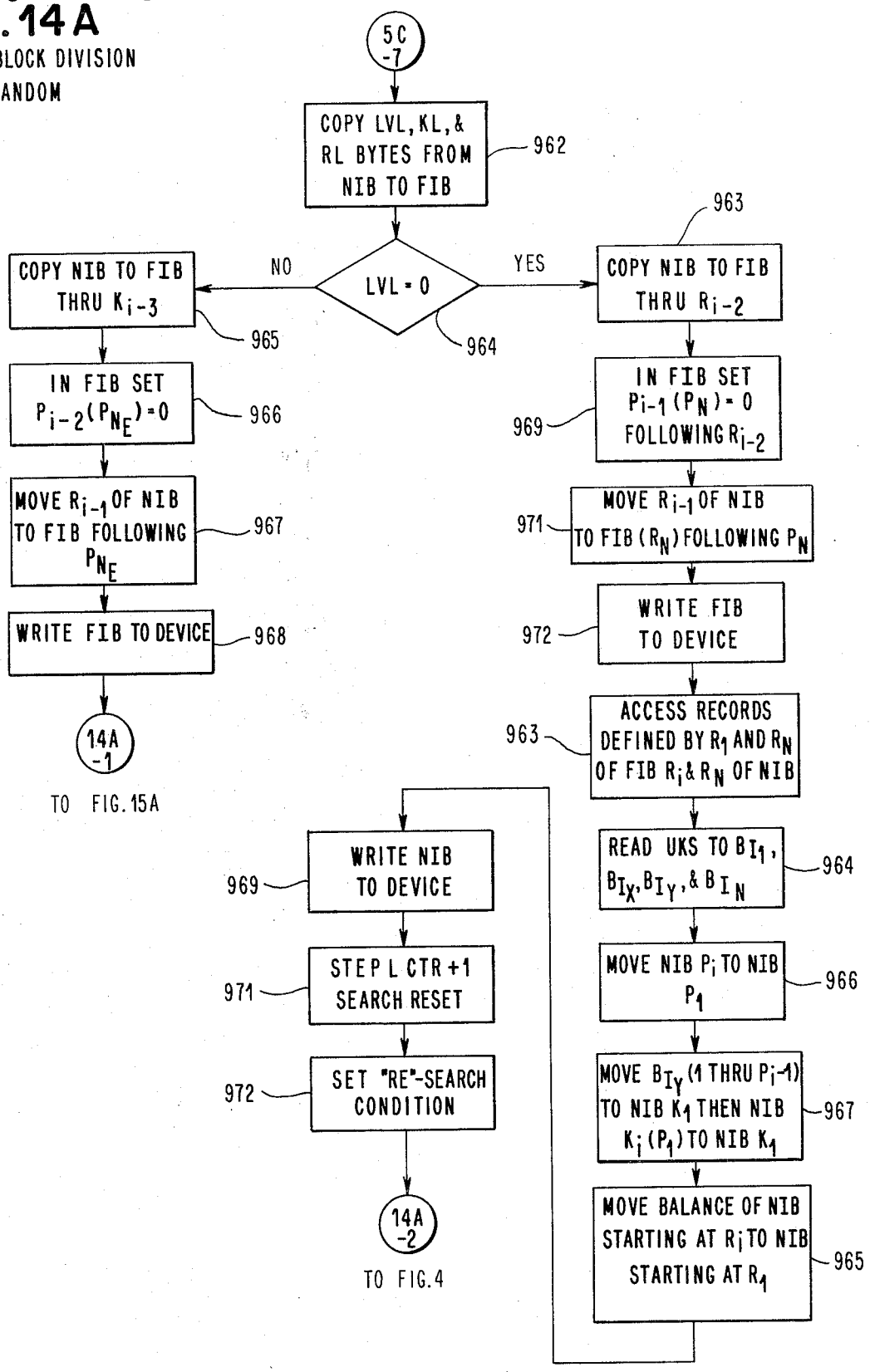
Figure 14B:
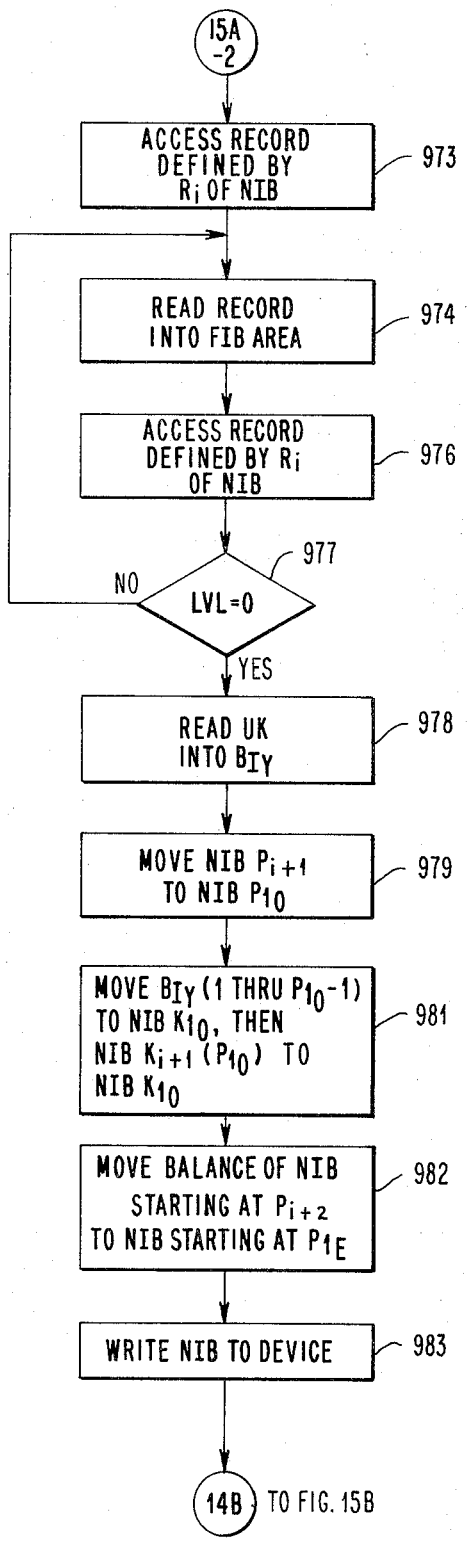
Figure 15A:
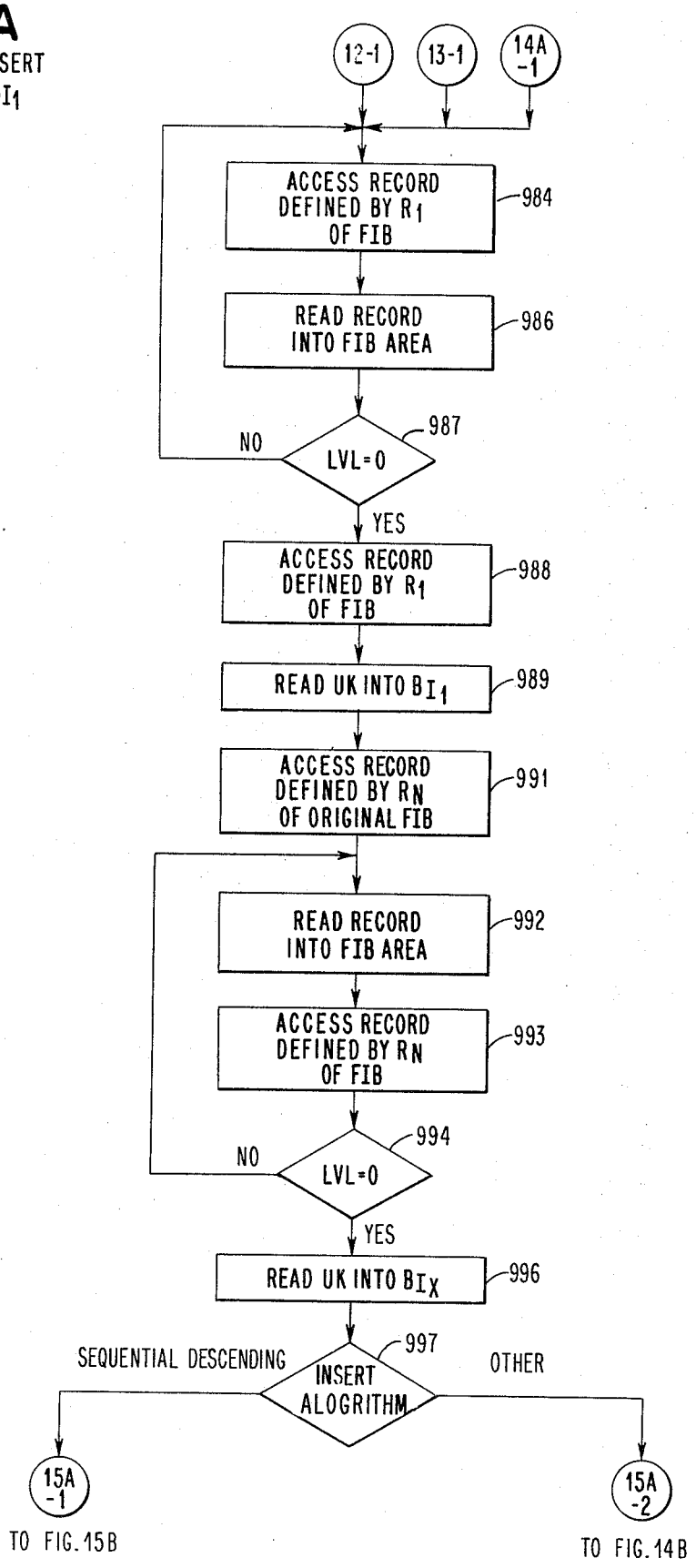
Figure 15B:
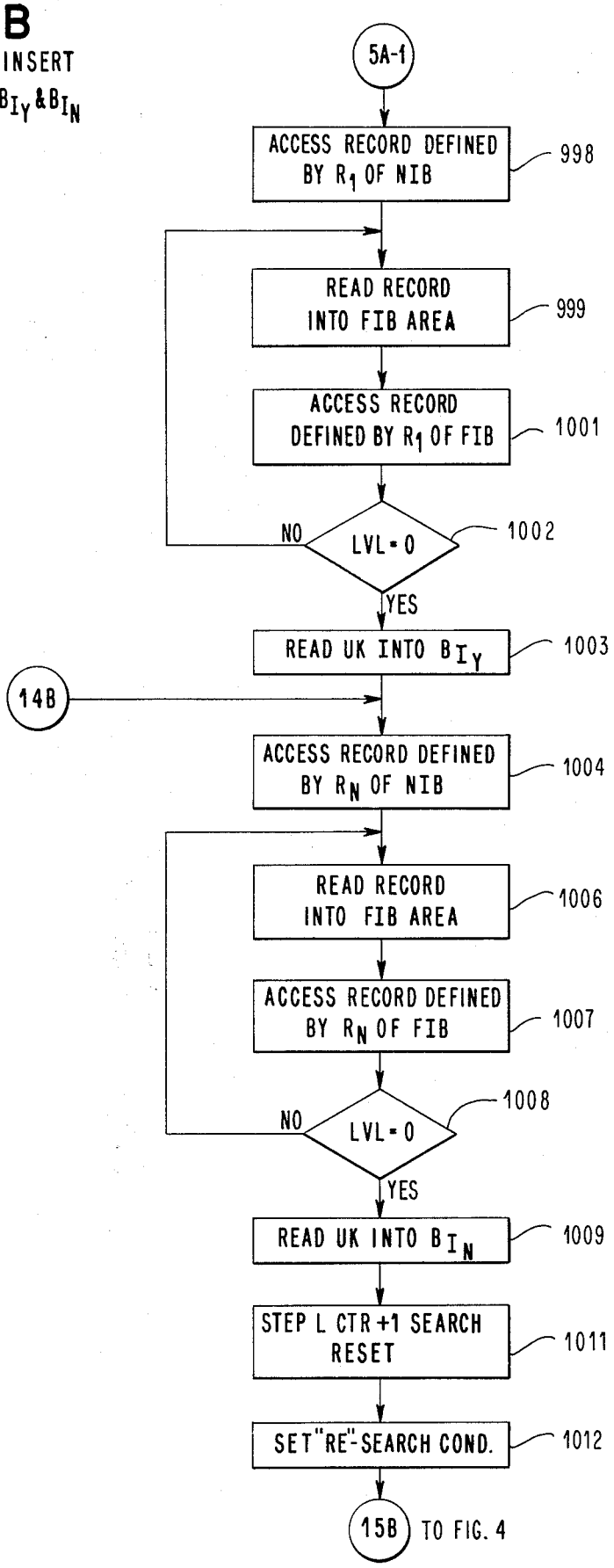
Figure 16A:
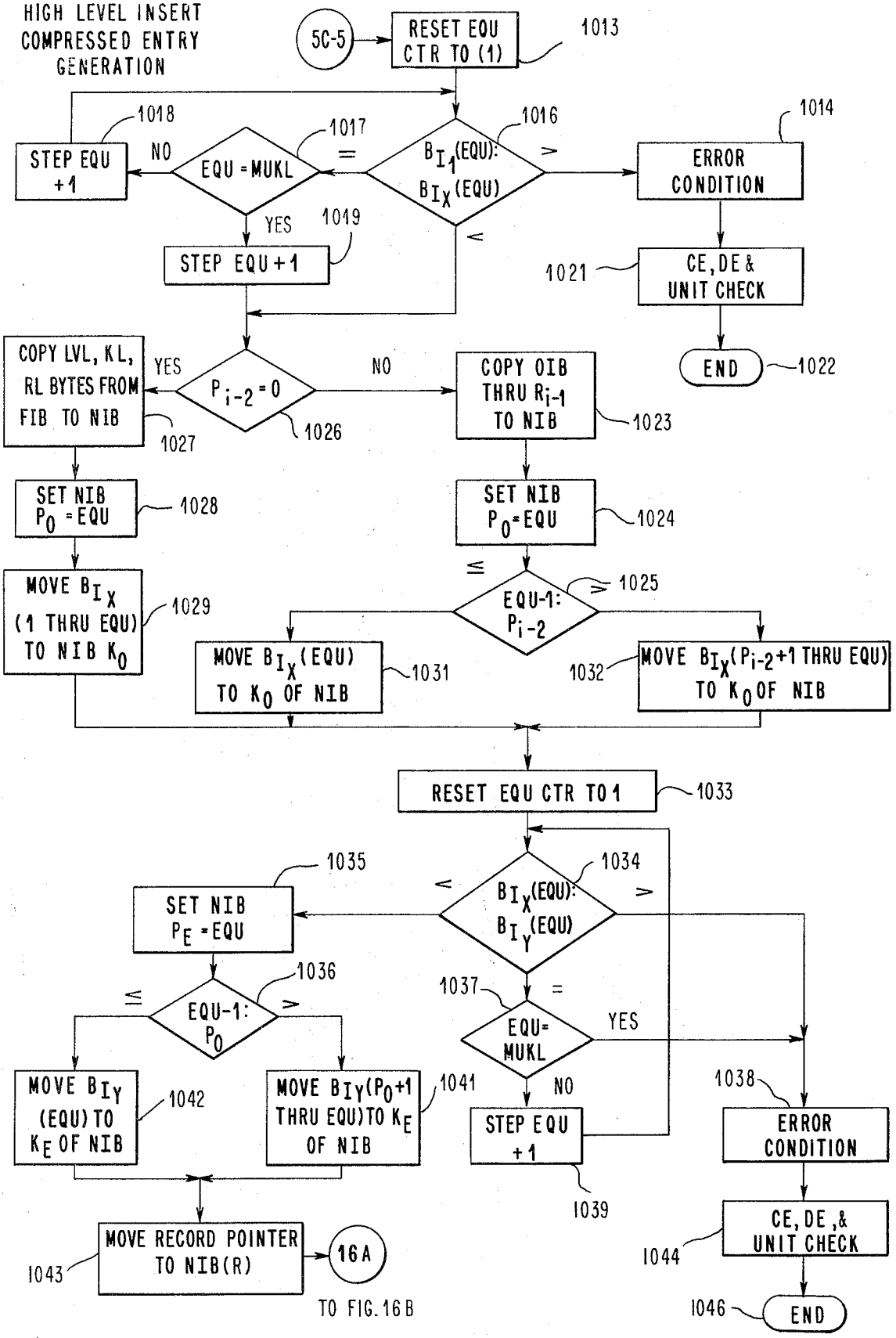
Figure 16B:
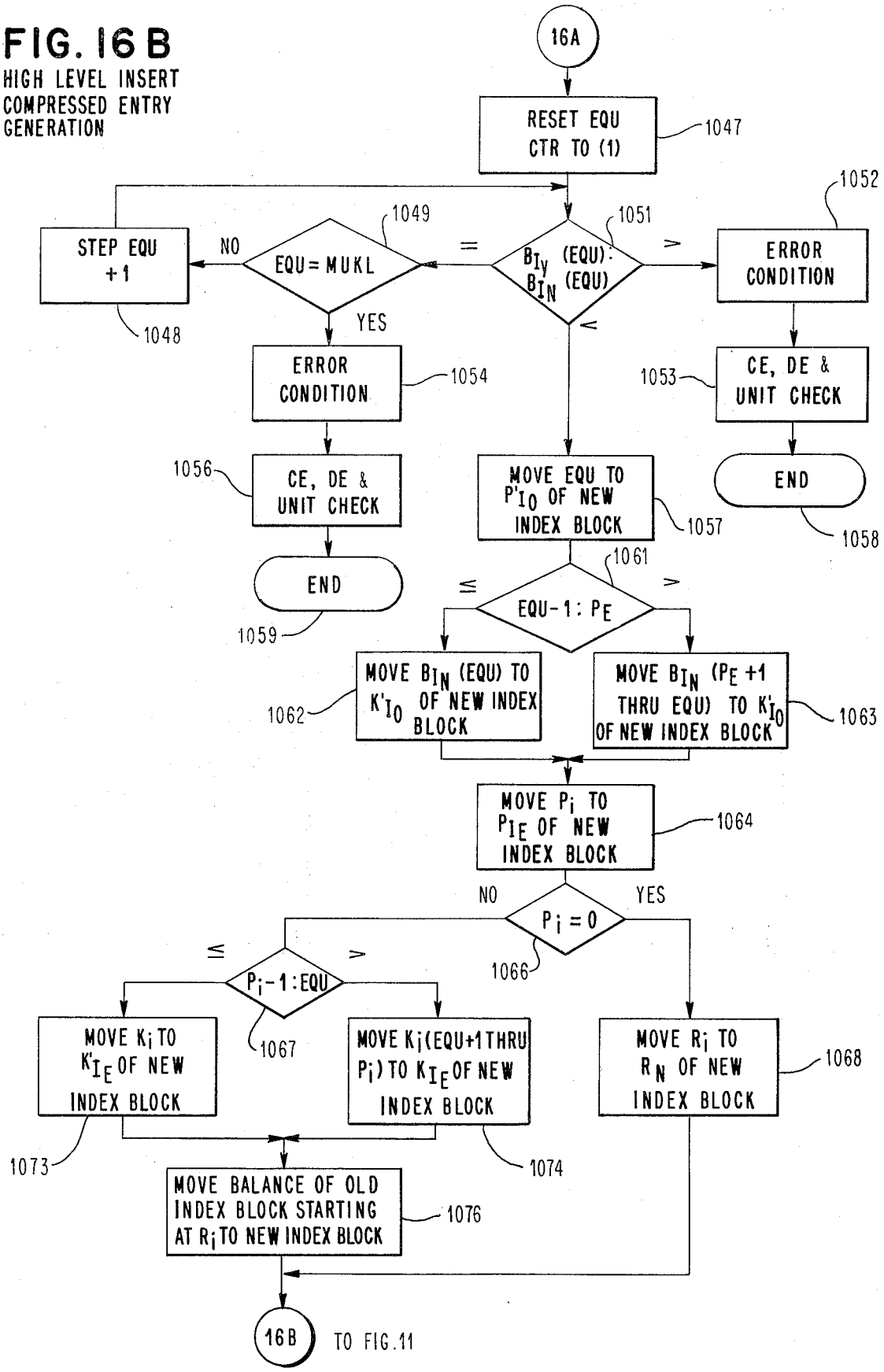
Figure 17:
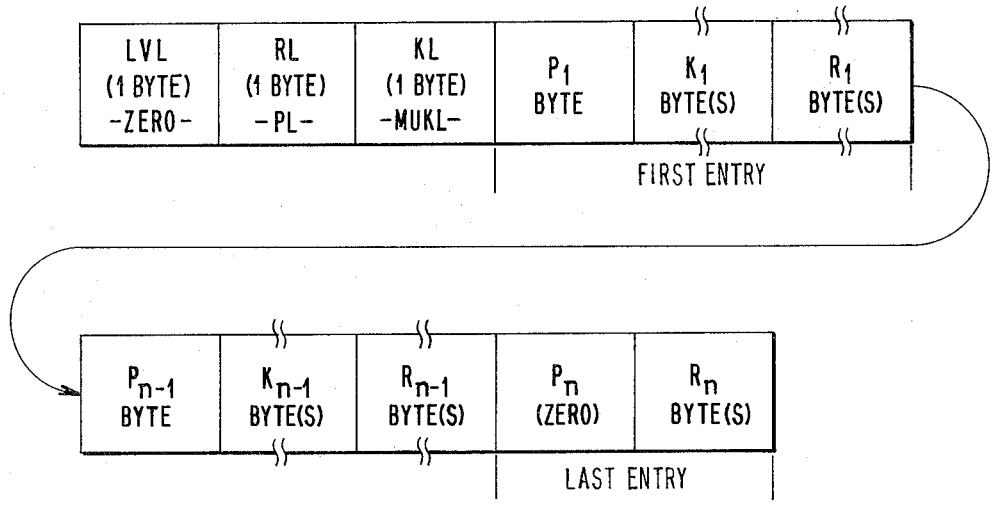
Figure 18:
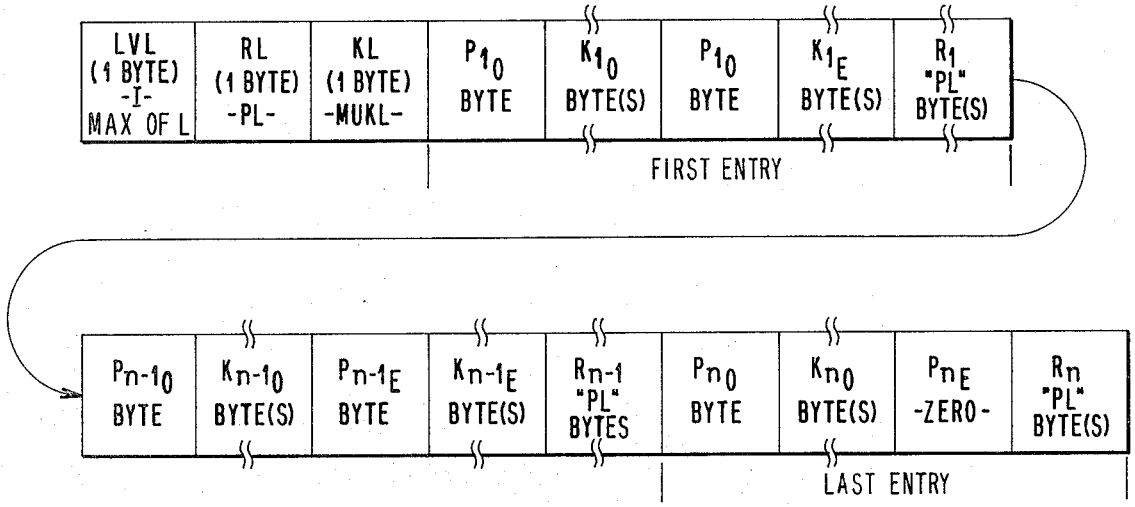
Figure 22:
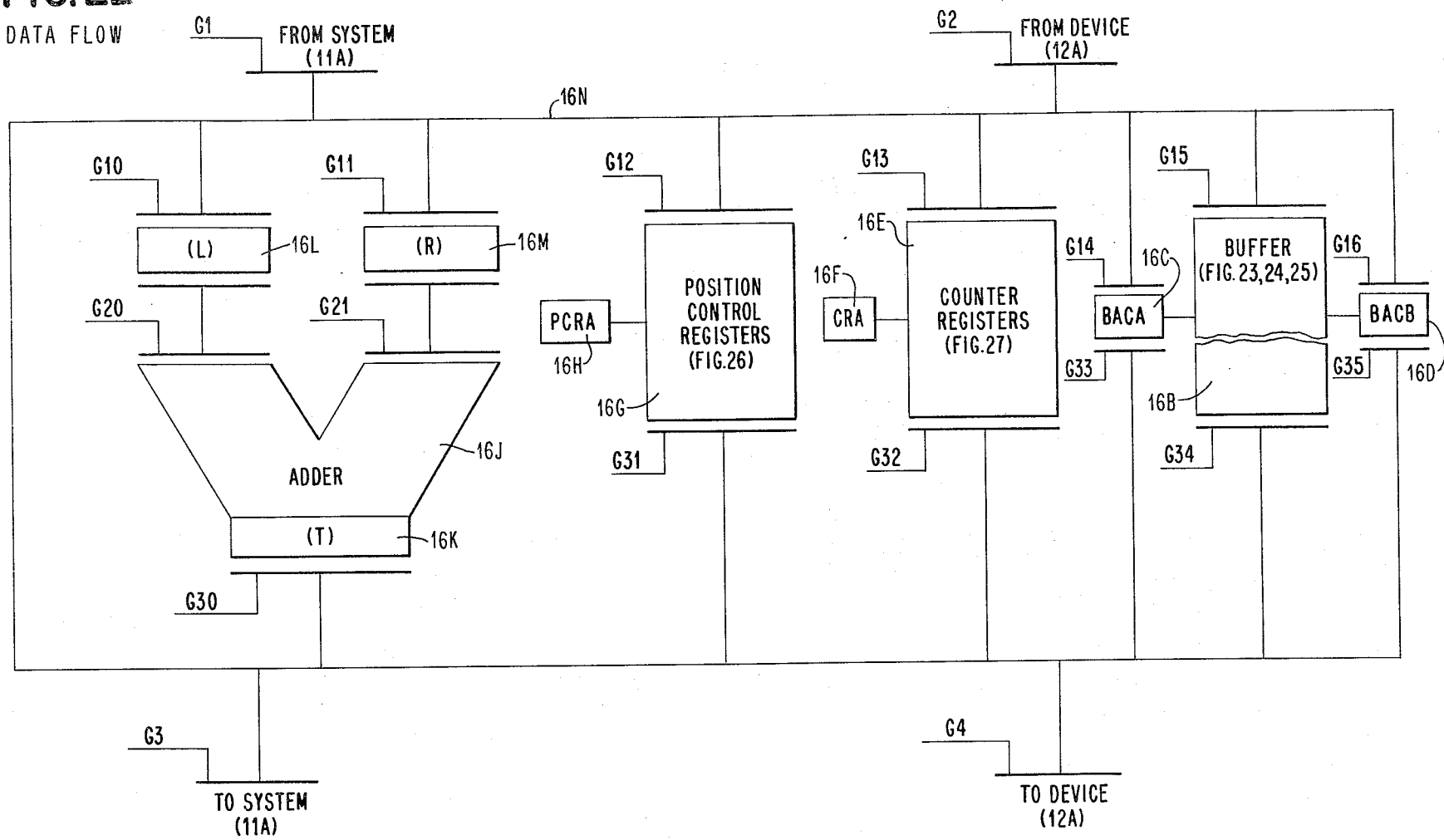

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 13

T947,005

MULTI-LEVEL COMPRESSED INDEX INSERTION AND DELETION METHOD AND MEANS

Edward Loizides, Poughkeepsie, and George F. Steigerwalt, Jr., Hyde Park, N.Y., assignors to International Business Machines Corporation, Armonk, N.Y.

Continuation of application Ser. No. 417,459, Nov. 19, 1973, which is a continuation of application Ser. No. 99,863, Dec. 21, 1970. This application Apr. 24, 1975, Ser. No. 573,494

Int. Cl. G06f *7/00*

U.S. Cl. 444—1

34 Sheets Drawing. 111 Pages Specification

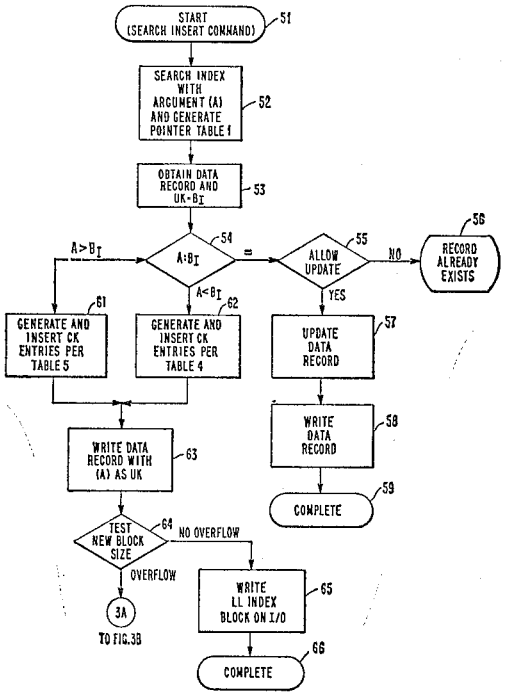

To enable the maintenance on a real-time basis of a multi-level compressed index generated by the method and means disclosed in U.S. Pat. 3,603,937 issued Sept. 7, 1971. Such index can be searched by the method and means disclosed in U.S. Pat. 3,643,226 issued Feb. 15, 1972. Two types of operation on an existing multi-level compressed index structure are disclosed; they are (1) insertion of new compressed key entries, and (2) deletion of existing compressed key entries Both operations (1) and (2) begin at the lowest index level and proceed upward through the multi-level compressed index hierarchy until the operations are complete.

SEARCH UPDATE COMMAND

INVENTORS
EDWARD LOIZIDES
GEORGE F. STEIGERWALT JR.

BY Bernard M. Goldman
ATTORNEY

SEARCH DELETE COMMAND

SEARCH INSERT COMMAND

SEARCH INSERT COMMAND (CONT.)

INITIALIZE
SEARCH

P CYCLE OF SEARCH

K CYCLE OF SEARCH

POINTER CYCLE OF SEARCH

DATA RECORD
ACCESSING

LOW LEVEL DELETION

INDEX BLOCK DELETION

HIGH LEVEL DELETE

HIGH LEVEL DELETE CONT.

DATA RECORD UPDATE

LOW-LEVEL INSERT COMPRESSED ENTRY GENERATION

LOW LEVEL INSERT
COMPRESSED ENTRY
GENERATION (CONT.)

LOW LEVEL INSERT COMPRESSED ENTRY GENERATION (CONT.)

INDEX BLOCK OVERFLOW

INDEX
BLOCK DIVISION
SEQUENTIAL
DECENDING

TO FIG. 15A

INDEX BLOCK DIVISION
SEQUENTIAL ASCENDING

INDEX BLOCK DIVISION
RANDOM

INDEX BLOCK
DIVISION RANDOM
(CONT.)

HIGH LEVEL INSERT
RETRIVAL OF $B_{I_1}$
& $B_{I_X}$

HIGH LEVEL INSERT
RETRIVAL OF $B_{I_Y}$ & $B_{I_N}$

HIGH LEVEL INSERT
COMPRESSED ENTRY
GENERATION

HIGH LEVEL INSERT
COMPRESSED ENTRY
GENERATION

LOW LEVEL COMPRESSED
INDEX BLOCK

HIGH LEVEL COMPRESSED INDEX
BLOCK FOR LEVEL "I"

FIG. 19
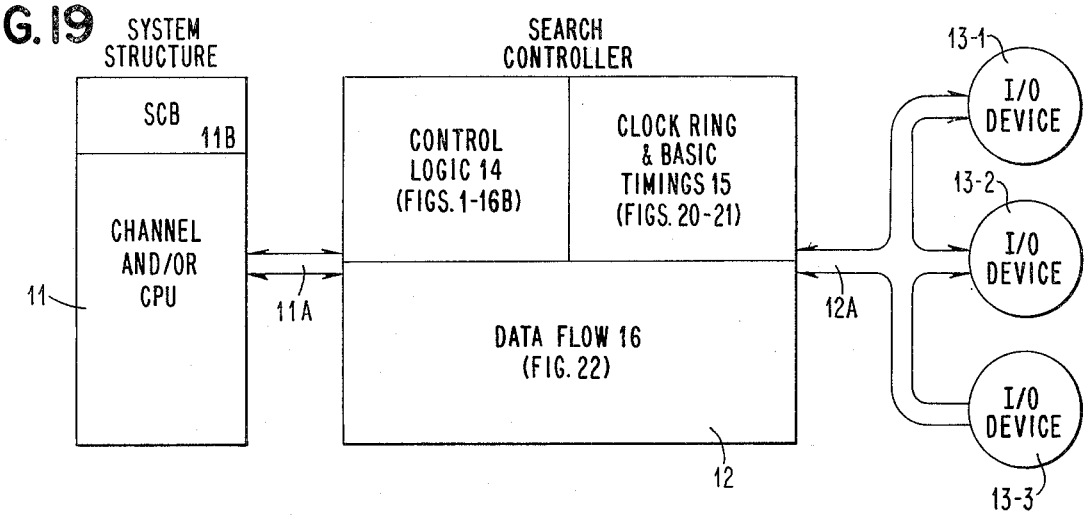
FIG. 20 CLOCK RING & BASIC TIMINGS
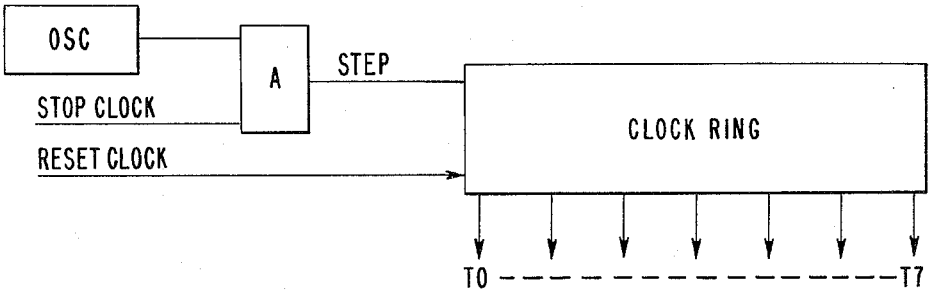
FIG. 21
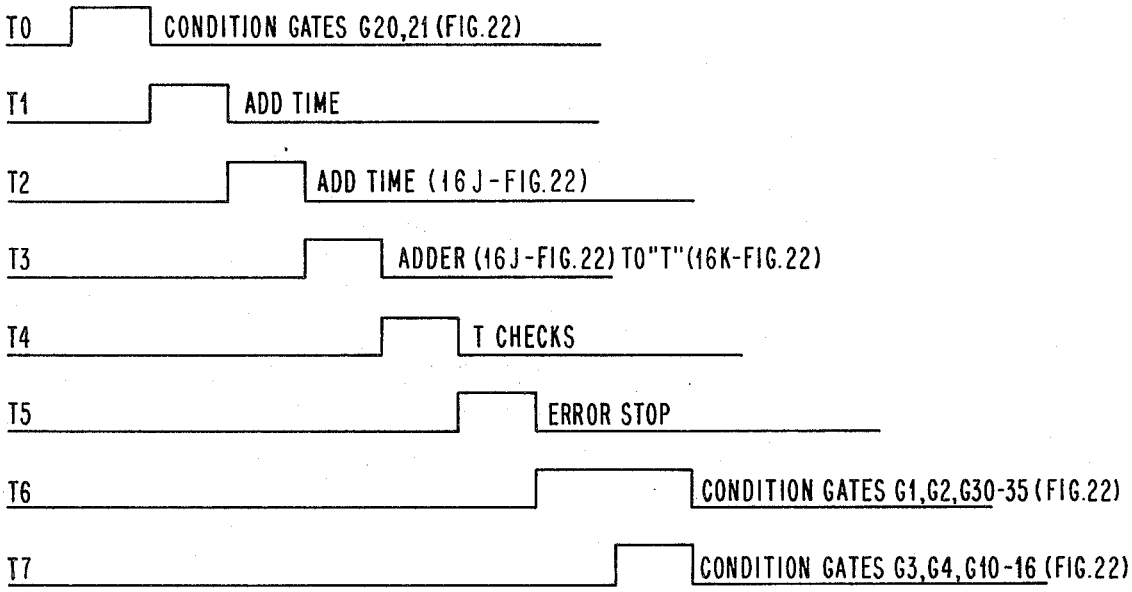

DATA FLOW

FIG. 23 BUFFER FORMAT
SEARCH INSERT

SEARCH CONTROL BLOCK (SCB)-("SCBL" BYTES)

Figure 28:
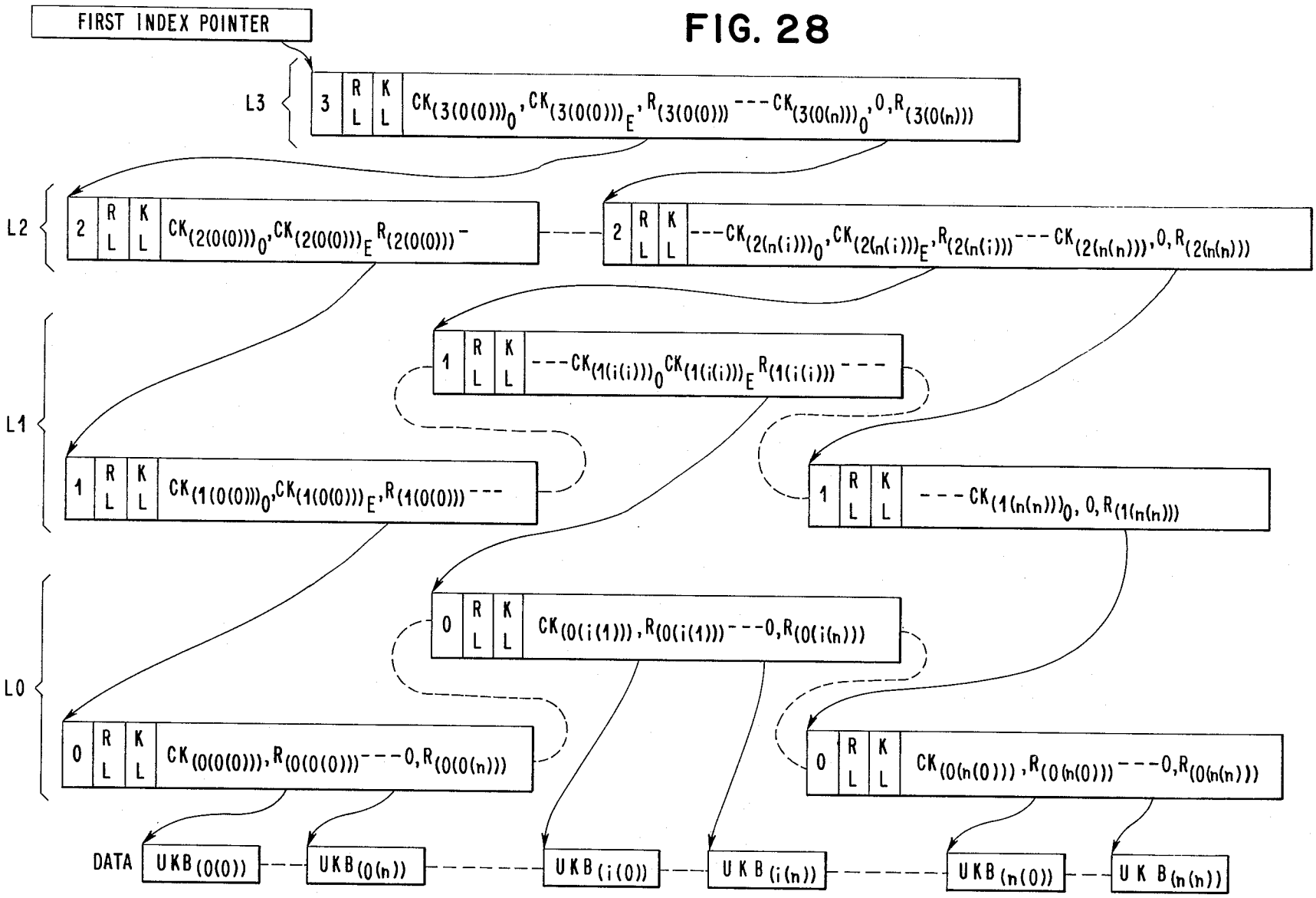
Figure 29:
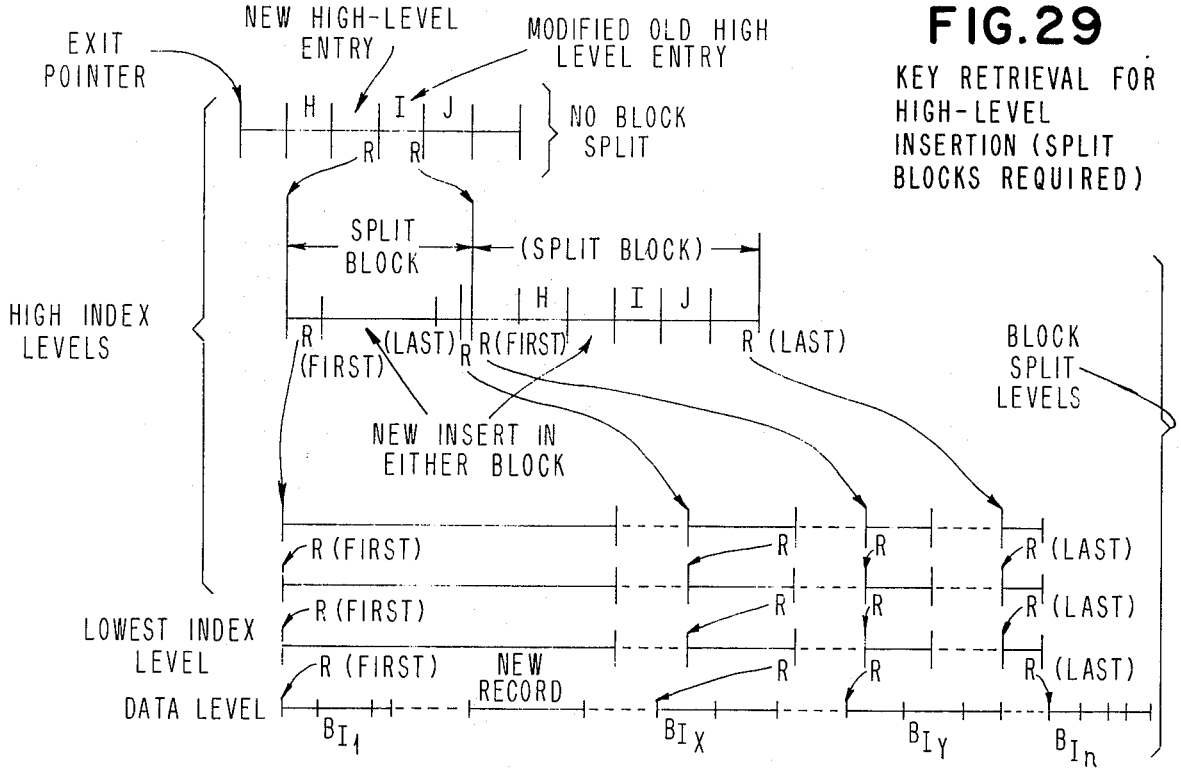
Figure 30:
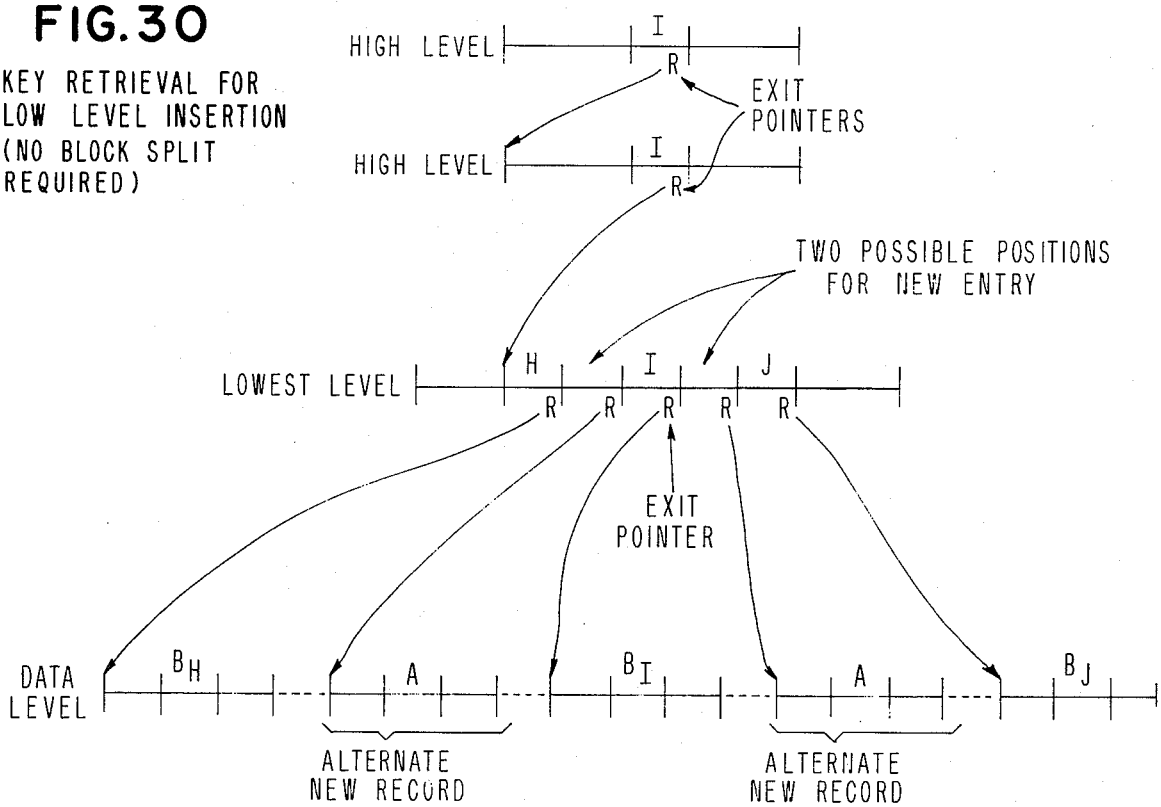

| | | | |
|---|---|---|---|
| COMMAND (CC) CODE (1 BYTE) | SEARCH CONTROL BLOCK LENGTH (SCBL) (3 BYTES) | | |
| KEY DISPLACEMENT (KD) (2 BYTES) | | DATA RECORD LENGTH (DRL) (2 BYTES) | |
| INDEX BLOCK DIVIDE POINT (IBDP) (2 BYTES) | | MAXIMUM INDEX BLOCK LENGTH (MIBL) (2 BYTES) | |
| STATUS CODE (1 BYTE) | LEVEL (L) (1 BYTE) | POINTER LENGTH (PL) (1 BYTE) | MAX. UK LENGTH (MUKL) (1 BYTE) |
| SEARCH ARGUMENT (A) ("MUKL" BYTES) | | | |
| NEW DATA RECORD (NDR) ("DRL" BYTES) | | | |
| DATA RECORD POINTER (DRP) ("PL" BYTES) | | | |
| INDEX BLOCK FREE POOL POINTER (IBFP) ("PL" BYTES) | | | |
| FIRST INDEX POINTER (FIP) ("PL" BYTES) | | | |
| BALANCE OF INDEX POINTER TABLE (IPT) ("L X PL" BYTES) FIG. 23A | | | |
| UK-$B_H$, OR $B_J$, OR $B_{I_1}$ ("PL" BYTES) | | | |
| UK-$B_{I_X}$ ("PL" BYTES) | | | |
| UK-$B_{I_Y}$ ("PL" BYTES) | | | |
| UK-$B_{I_N}$ ("PL" BYTES) | | | |
| OLD INDEX BLOCK (OIB)/FIRST INDEX BLOCK (FIB) (MIBL BYTES) FIG. 28 OR 29 | | | |
| NEW INDEX BLOCK (NIB)-(MIBL BYTES) FIG. 28 OR 29 | | | |
| DATA RECORD AREA - (DRL BYTES) (INCLUDES UK $B_I$) | | | |

FIG. 23A INDEX POINTER TABLE

| | "L X PL" BYTES | | |
|---|---|---|---|
| FIRST INDEX POINTER(FIP) | INDEX POINTER AT "L-1" | | INDEX POINTER AT "L=0" |
| "PL" BYTES | "PL" BYTES | | "PL" BYTES |

FIG. 24 BUFFER FORMAT SEARCH DELETE

SEARCH CONTROL BLOCK (SCB) ("SCBL" BYTES)

| | | | |
|---|---|---|---|
| COMMAND CODE (1 BYTE) | SEARCH CONTROL BLOCK LENGTH (SCBL) (3 BYTES) | | |
| KEY DISPLACEMENT (KD) (2 BYTES) | | DATA RECORD LENGTH (DRL) (2 BYTES) | |
| UNUSED (2 BYTES) | | MAXIMUM INDEX BLOCK LENGTH (MIBL) (2 BYTES) | |
| STATUS CODE (1 BYTE) | LEVEL (L) (1 BYTE) | POINTER LENGTH (PL) (1 BYTE) | MAX UK LENGTH (MUKL) (1 BYTE) |
| SEARCH ARGUMENT (A) ("MUKL" BYTES) | | | |
| INDEX BLOCK FREE POOL POINTER (IBFP) ("PL" BYTES) | | | |
| FIRST INDEX POINTER (FIP) ("PL" BYTES) | | | |
| BALANCE OF INDEX POINTER TABLE (IPT) ("PLX (L)" BYTES) FIG. 23A | | | |
| OLD INDEX BLOCK (OIB) ("MIBL" BYTES) (FIG. 28 OR 29) | | | |
| NEW INDEX BLOCK (NIB) ("MIBL" BYTES) (FIG. 28 OR 29) | | | |
| DATA RECORD AREA (DRL BYTES) (INCLUDES UK $B_I$) | | | |

FIG. 25 BUFFER FORMAT SEARCH UPDATE

SEARCH CONTROL BLOCK (SCB) ("SCBL" BYTES)

| | | | |
|---|---|---|---|
| COMMAND CODE (1 BYTE) | SEARCH CONTROL BLOCK LENGTH (SCBL) (3 BYTES) | | |
| KEY DISPLACEMENT (KD) (2 BYTES) | | DATA RECORD LENGTH (DRL) (2 BYTES) | |
| UNUSED (2 BYTES) | | MAXIMUM INDEX BLOCK LENGTH (MIBL) (2 BYTES) | |
| STATUS CODE (1 BYTE) | LEVEL (L) (1 BYTE) | POINTER LENGTH (PL) (1 BYTE) | MAX UK LENGTH (MUKL) (1 BYTE) |
| SEARCH ARGUMENT (A) ("MUKL" BYTES) | | | |
| UPDATE DATA RECORD (UDR) ("VARIABLE" NUMBER OF BYTES) FIG. 25A | | | |
| FIRST INDEX POINTER (FIP) ("PL" BYTES) | | | |
| OLD INDEX BLOCK (OIP) ("MIBL" BYTES) (FIG. 28 OR 29) | | | |
| DATA RECORD AREA (DRL BYTES) (INCLUDES UK $B_I$) | | | |

FIG. 25A

UPDATE DATA
RECORD FORMAT

FIRST EDIT RECORD

| DISPLACEMENT (D) (2 BYTES) | LENGTH (L) (2 BYTES) | DATA ("L" BYTES) | |
|---|---|---|---|

LAST EDIT RECORD

| DISPLACEMENT (D) (2 BYTES) | LENGTH (L) (2 BYTES) | DATA ("L" BYTES) | ZERO'S (2 BYTES) |
|---|---|---|---|

FIG. 26 POSITION CONTROL REGISTER FORMAT

| (1 BYTE) | (3 BYTES) |
|---|---|
| $P_{i-2}$ | BUFFER ADDRESS OF $P_{i-2}$ |
| $P_{i-1}$ | BUFFER ADDRESS OF $P_{i-1}$ |
| $P_i$ | BUFFER ADDRESS OF $P_i$ |
| $P_{i+1}$ | BUFFER ADDRESS OF $P_{i+1}$ |

FIG. 27 COUNTER REGISTER

| 0 | 1 | 2 | 3 | 4 | 5 |
|---|---|---|---|---|---|
| EQU CTR | P CTR | PTR CTR | TABLE CTR | L CTR | IB CTR |

KEY RETRIEVAL FOR HIGH-LEVEL INSERTION (SPLIT BLOCKS REQUIRED)

KEY RETRIEVAL FOR LOW LEVEL INSERTION (NO BLOCK SPLIT REQUIRED)